(12) United States Patent
Hartman et al.

(10) Patent No.: US 6,807,636 B2
(45) Date of Patent: Oct. 19, 2004

(54) METHODS AND APPARATUS FOR FACILITATING SECURITY IN A NETWORK

(75) Inventors: Bret A. Hartman, Action, MA (US); Donald J. Flinn, Marblehead, MA (US); Theodore R. Burghart, Jr., Mendon, MA (US)

(73) Assignee: Hitachi Computer Products (America), Inc., Waltham, MA (US)

(*) Notice: Subject to any disclaimer, the term of this patent is extended or adjusted under 35 U.S.C. 154(b) by 45 days.

(21) Appl. No.: 10/075,812

(22) Filed: Feb. 13, 2002

(65) Prior Publication Data

US 2003/0154401 A1 Aug. 14, 2003

(51) Int. Cl.[7] .............................. G06F 11/30; H04L 9/00
(52) U.S. Cl. ........................ 713/201; 713/200; 713/202; 713/153; 713/167
(58) Field of Search ................................ 713/200, 201, 713/202, 153, 167

(56) References Cited

U.S. PATENT DOCUMENTS

| | | | |
|---|---|---|---|
| 5,577,209 A | 11/1996 | Boyle et al. | |
| 5,778,373 A | 7/1998 | Levy et al. | |
| 5,873,093 A | 2/1999 | Williamson et al. | |
| 5,974,149 A | * 10/1999 | Leppek | ....................... 713/164 |
| 6,131,120 A | 10/2000 | Reid | |
| 6,148,336 A | 11/2000 | Thomas et al. | |
| 6,158,010 A | 12/2000 | Moriconi et al. | |
| 6,226,745 B1 | 5/2001 | Wiederhold | |
| 6,243,746 B1 | 6/2001 | Sondur et al. | |
| 6,542,993 B1 | * 4/2003 | Erfani | ......................... 713/201 |
| 2001/0007133 A1 | 7/2001 | Moriconi et al. | |

OTHER PUBLICATIONS

Hartman, Bret A., Flinn, Donald J., and Beznosov Konstantin—*Enterprise Security with EJB™ and CORBA®*, OMG Press, Published Apr. 2001.

* cited by examiner

*Primary Examiner*—Matthews Smithers
*Assistant Examiner*—Courtney D. Fields
(74) *Attorney, Agent, or Firm*—Buckley, Maschoff & Talwalkar LLC

(57) ABSTRACT

A system, method, apparatus, means, and computer program code for facilitating security in a network, particularly a distributed network. According to embodiments of the present invention an apparatus or system may include a manager in communication with one or more mappers and one or more adapters for facilitating security requests that may be associated with an application or its environment. An adapter may be associated with an application to identify security requests associated with the application. Similarly, a mapper may be associated with a security service to facilitate communication to and from the security service regarding security requests.

47 Claims, 7 Drawing Sheets

METHODS AND APPARATUS FOR FACILITATING SECURITY IN A NETWORK

FIELD OF THE INVENTION

The present invention relates to a method and apparatus for facilitating security in a network and, more particularly, embodiments of the present invention relate to methods, means, apparatus, and computer program code for facilitating security requests associated with applications and responded to by security services in a network.

BACKGROUND OF THE INVENTION

Many organizations face the problem of automating and streamlining software applications in order to increase revenues and profits, improve customer relations, etc. While allowing access to and use of such applications by authorized employees, contractors, or other users, the organizations also must prevent unauthorized access and use. For example, a bank may enhance its relationships with commercial customers by providing increased efficiency with on-line currency trading. This type of service may require real-time updates and links to back office transactional systems in order to function properly. At a minimum, the bank needs to protect the integrity of its core systems from unauthorized transfers or tampering. As another example, a manufacturer may accelerate the development and manufacturing cycle for new products by creating a centralized World Wide Web ("Web") site that maintains development and manufacturing research and other information for use by its engineers and scientists. As a result, plant engineers on one continent can share process breakthroughs with their colleagues around the globe. As the manufacturer may want to limit disclosure of its trade secrets and methods, the manufacturer may want to ensure that its competitors or sub-contractors cannot access the Web site.

In general terms, in order to secure its information assets, an organization may want to provide several protections. First, the organization may want to safeguard user privacy and prevent the theft of information both while it is stored and while it is in transit. Second, the organization may want to ensure that electronic transactions and data resources are not tampered with at any point, either accidentally or maliciously. Third, the organization may want to detect attacks in progress or be able to trace any damage from successful attacks as well as be able to prevent users from later denying completed transactions. Fourth, the organization may want to ensure uninterrupted service to authorized users and prevent either accidental or maliciously caused service interruptions. In order to provide these key protections such that legitimate users can access applications while unauthorized access is barred, information security must be an integral part of the organizations network and system design and implementation.

An organization may use a distributed network architecture to allow disparately located users to access applications, data and other resource components. Unfortunately, making such applications, data and other resource components available across a wide network makes them harder to protect. Moreover, security functionality also may be distributed throughout the network rather than residing in a central location, thereby making it easier to bypass or spoof them. As a further complication, distributed networks are often heterogeneous; that is, they may use applications and security products from many different vendors and such applications and security products may be implemented differently on different platforms.

As one example of the difficultly in providing adequate security in a typical enterprise architecture, a user may access a Web based business application using a browser that in turn communicates with the business application via a Web server. A request from the user may be transmitted through a complex multi-tier chain of software applications operating on a variety of platforms before it reaches the back-office business application, which may then access databases on behalf of the user, process the user's request, and return the appropriate results. In order to provide end-to-end security, and to ensure that security safeguards cannot be bypassed, each link in the chain of requests and replies must be properly protected, i.e., from the initiating browser, through mid-tier business components, to the back-office business application and databases, and then back again to the browser. There are at least three security tiers that comprise an end-to-end security system for this example: (1) perimeter security technologies which are used between the browser and the Web server; (2) mid-tier security technologies which are used between the mid-tier business components; and (3) back-office security technologies which address protection of databases and operating system specific back-end systems (e.g., mainframes, UNIX and Windows NT server platforms).

As a result of all of this, security for different applications may be distributed across the network or performed by different security components (e.g., at a hardware level, by middleware, by an operating system). In addition, a particular distributed application may be secure, but confirmation of such security for the application may be difficult, or even impossible, to confirm.

It would be advantageous to provide a method and apparatus that overcame the drawbacks of the prior art. In particular, it would be desirable to provide methods and apparatus that facilitated integrated security across the perimeter, middle, and back-office security tiers while allowing the use of applications and security services that are from different vendors and/or that are based or operating on different platforms.

SUMMARY OF THE INVENTION

Embodiments of the present invention provide a system, method, apparatus, means, and computer program code for facilitating security in a network, particularly a distributed network.

According to some embodiments of the present invention, a system or security framework for facilitating security in a network may include an adapter associated with one or more applications, a manager, and/or one or more mappers associated with one or more security services. The manager may be capable of selecting a security request to handle or otherwise process a security request associated with an application.

The adapter may intercept or otherwise identify a security request associated with the application and provide data indicative of the security request to the manager. The manager may receive the data indicative of the security request from the adapter, determine a security service to process the security request, and provide the data indicative of the security request to the mapper associated with the selected security service.

The mapper called, loaded or otherwise selected by the manager may receive the data indicative of the security request from the manager, prepare a security service version of the security request, and call the security service to process the security service version of the security request.

After the security service processes the security request and creates a response to the security request, the mapper may receive the response to the security service version of the security request from the security service and provide data indicative of the response to the manager.

After receiving the data indicative of the response from the mapper, the manager may provide data indicative of the response to the adapter. In turn, the adapter may prepare a response regarding the security request after receiving the data indicative of the response from the manager and provide the response to the application.

Additional advantages and novel features of the invention shall be set forth in part in the description that follows, and in part will become apparent to those skilled in the art upon examination of the following or may be learned by the practice of the invention.

According to some embodiments of the present invention, a method for facilitating security in a system, wherein the system includes a manager module used in routing a security request associated with an application to a security service module, may include receiving data indicative of a security request from a module associated with an application that identified the security request; selecting a security service module capable of processing the security request; and providing at least some of the data indicative of the security request to a module capable of calling the security service module to process the security request. According to some further embodiments of the present invention, a method for facilitating security in a system, wherein the system includes an adapter module associated with an application, may include identifying a security request associated with the application; and providing data indicative of the security request to a module in the system that can select a security service module to process the security request, wherein the data indicative of the security request is in a format independent of the application. According to some additional embodiments of the present invention, a method for facilitating security in a system, wherein the system includes a mapper module associated with a security service module, may include receiving data indicative of a security request associated with an application from a module capable of selecting the security service module to process the security request, wherein the data associated with the security request is in a format independent of the application; and providing data indicative of the security request to the security service module. According to some even further embodiments of the present invention, a method for facilitating security in system that includes an adapter module associated with an application, at least one mapper module associated with at least one respective security service module, and a manager module in communication with the adapter module and the at least one mapper module, may include the steps of identifying a security request associated with an application; determining a security service module that can process the security request; calling the security service module; receiving a response to the security request from the security service module; and providing the response to the application.

According to some additional embodiments of the present invention, a method for facilitating security in a system that includes an adapter module associated with an application, at least one mapper module associated with at least one respective security service module, and a manager module in communication with the adapter module and the at least one mapper module, may include the steps of identifying a first security request associated with an application; translating the first security request to create data indicative of the first security request; determining a security service module that can process the first security request; creating a second security request directed to the security service module and based on the data indicative of the first security request; calling the security service module; receiving a first response from the security service module regarding the second security request; translating the first response to create data indicative of the first response; creating a second response regarding the first security request based on the data indicative of the first response; and providing the second response to the application.

According to some embodiments of the present invention, an apparatus for facilitating security in a system, wherein the system includes a manager module used in routing a security request associated with an application to a security service module, may include means for obtaining data indicative of a security request from a module associated with an application that identified the security request; means for identifying a security service module capable of processing the security request; and means for sending at least some of the data indicative of the security request to a module capable of calling the security service module to process the security request. According to some further embodiments of the present invention, an apparatus for facilitating security in a system, wherein the system includes an adapter module associated with an application, may include means for obtaining a security request associated with the application; and means for sending data indicative of the security request to a module in the system that can select a security service module to process the security request, wherein the data indicative of the security request is in a format independent of the application. According to some additional embodiments of the present invention, an apparatus for facilitating security in a system, wherein the system includes a mapper module associated with a security service module, may include means for obtaining data indicative of a security request associated with an application from a module capable of selecting the security service module to process the security request, wherein the data associated with the security request is in a format independent of the application; and means for sending data indicative of the security request to the security service module. According to some even further embodiments of the present invention, an apparatus for facilitating security in system that includes an adapter module associated with an application, at least one mapper module associated with at least one respective security service module, and a manager module in communication with the adapter module and the at least one mapper module, may include means for obtaining a security request associated with an application; means for identifying security service module that can process the security request; calling the security service module; means for obtaining a response to the security request from the security service module; and means for sending the response to the application. According to some additional embodiments of the present invention, an apparatus for facilitating security in a system that includes an adapter module associated with an application, at least one mapper module associated with at least one respective security service module, and a manager module in communication with the adapter module and the at least one mapper module, may include means for obtaining a first security request associated with an application; means for parsing the first security request to create data indicative of the first security request; means for identifying a security service module that can process the first security request; means for generating a second security request directed to the security service module and based on the data indicative of the first security request; means for loading the security service module; means for obtaining a first response from the security service module regarding the second security request; means for parsing the first response to create data indicative of the first response; means for generating a second response regarding the first security request based on the data indicative of the first response; and means for sending the second response to the application.

According to some embodiments of the present invention, a computer program in a computer readable medium for facilitating security in a system, wherein the system includes a manager module used in routing a security request associated with an application to a security service module, may include first instructions for obtaining data indicative of a security request from a module associated with an application that identified the security request; second instructions for identifying a security service module capable of processing the security request; and third instructions for sending at least some of the data indicative of the security request to a module capable of calling the security service module to process the security request. According to some further embodiments of the present invention, a computer program in a computer readable medium for facilitating security in a system, wherein the system includes an adapter module associated with an application, may include first instructions for obtaining a security request associated with the application; and second instructions for sending data indicative of the security request to a module in the system that can select a security service module to process the security request, wherein the data indicative of the security request is in a format independent of the application. According to some additional embodiments of the present invention, a computer program in a computer readable medium for facilitating security in a system, wherein the system includes a mapper module associated with a security service module, may include first instructions for obtaining data indicative of a security request associated with an application from a module capable of selecting the security service module to process the security request, wherein the data associated with the security request is in a format independent of the application; and second instructions for sending data indicative of the security request to the security service module. According to some even further embodiments of the present invention, a computer program in a computer readable medium for facilitating security in a system that includes an adapter module associated with an application, at least one mapper module associated with at least one respective security service module, and a manager module in communication with the adapter module and the at least one mapper module, may include first instructions for obtaining a security request associated with an application; second instructions for identifying security service module that can process the security request; calling the security service module; third instructions for obtaining a response to the security request from the security service module; and fourth instructions for sending the response to the application. According to some additional embodiments of the present invention, a computer program in a computer readable medium for facilitating security in a system that includes an adapter module associated with an application, at least one mapper module associated with at least one respective security service module, and a manager module in communication with the adapter module and the at least one mapper module, may include first instructions for obtaining a first security request associated with an application; second instructions for parsing the first security request to create data indicative of the first security request; third instructions for identifying a security service module that can process the first security request; fourth instructions for generating a second security request directed to the security service module and based on the data indicative of the first security request; fifth instructions for loading the security service module; sixth instructions for obtaining a first response from the security service module regarding the second security request; seventh instructions for parsing the first response to create data indicative of the first response; eighth instructions for generating a second response regarding the first security request based on the data indicative of the first response; and ninth instructions for sending the second response to the application.

According to some embodiments of the present invention, a system for facilitating security in a system may include an adapter module associated with an application; a mapper module associated with a security service module; a manager module in communication with the adapter module and the mapper module; wherein the adapter module can identify a security request associated with the application, provide data indicative of the security request to the manager module, and provide a response to the application regarding the security request after receiving data indicative of the response from the manager module; wherein the manager module can receive the data indicative of the security request from the adapter module, provide the data indicative of the security request to the mapper module if the security service module associated with the mapper module can process the security request, and provide data indicative of the response to the adapter module after receiving the data indicative of the response from the mapper module; and wherein the mapper module can receive the data indicative of the security request from the manager module, prepare a security service module version of the security request, calls the security service module to process the security service module version of the security request, receives a response to the security service module version of the security request from the security service module, and provide data indicative of the response to the manager module.

According to some embodiments of the present invention, a module for facilitating security in a network may include an adapter module, wherein the adapter module is operative to identify a security request associated with an application, provide data indicative of the security request to a manager module capable of selecting a security service module to process the security request, and provide a response to the application regarding the security request after receiving data indicative of the response from the manager module.

According to some embodiments of the present invention, a module for facilitating security in a system may include a manager module, wherein the manager module is operative to receive data indicative of a security request associated with an application from an adapter module associated with the application, determine a security service module to process the security request, provide data indicative of the security request to a mapper module associated with the security service module, and provide data indicative of a response regarding the security request to the adapter module after receiving the data indicative of the response from the mapper module.

According to some embodiments of the present invention, a module for facilitating security in a system may include a mapper module associated with a security service module, wherein the mapper module is operative to receive from a manager module data indicative of a security request associated with an application, prepare a version of the security request specific to a security service module selected by the manager module, call the security service module to process the security service module specific version of the security request, receive a response to the security service module version of the security request from the security service module, and provide data indicative of the response to the manager module.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DETAILED DESCRIPTION

Applicants have recognized that there is a need for systems, means and methods that facilitate security in a network. In addition, applicants have recognized that there is a need to integrate or facilitate security in a distributed system or network that may use different hardware and software products or platforms. These and other features will be discussed in further detail below, by describing a system, individual devices, and processes according to embodiments of the invention.

System

Figure 1:
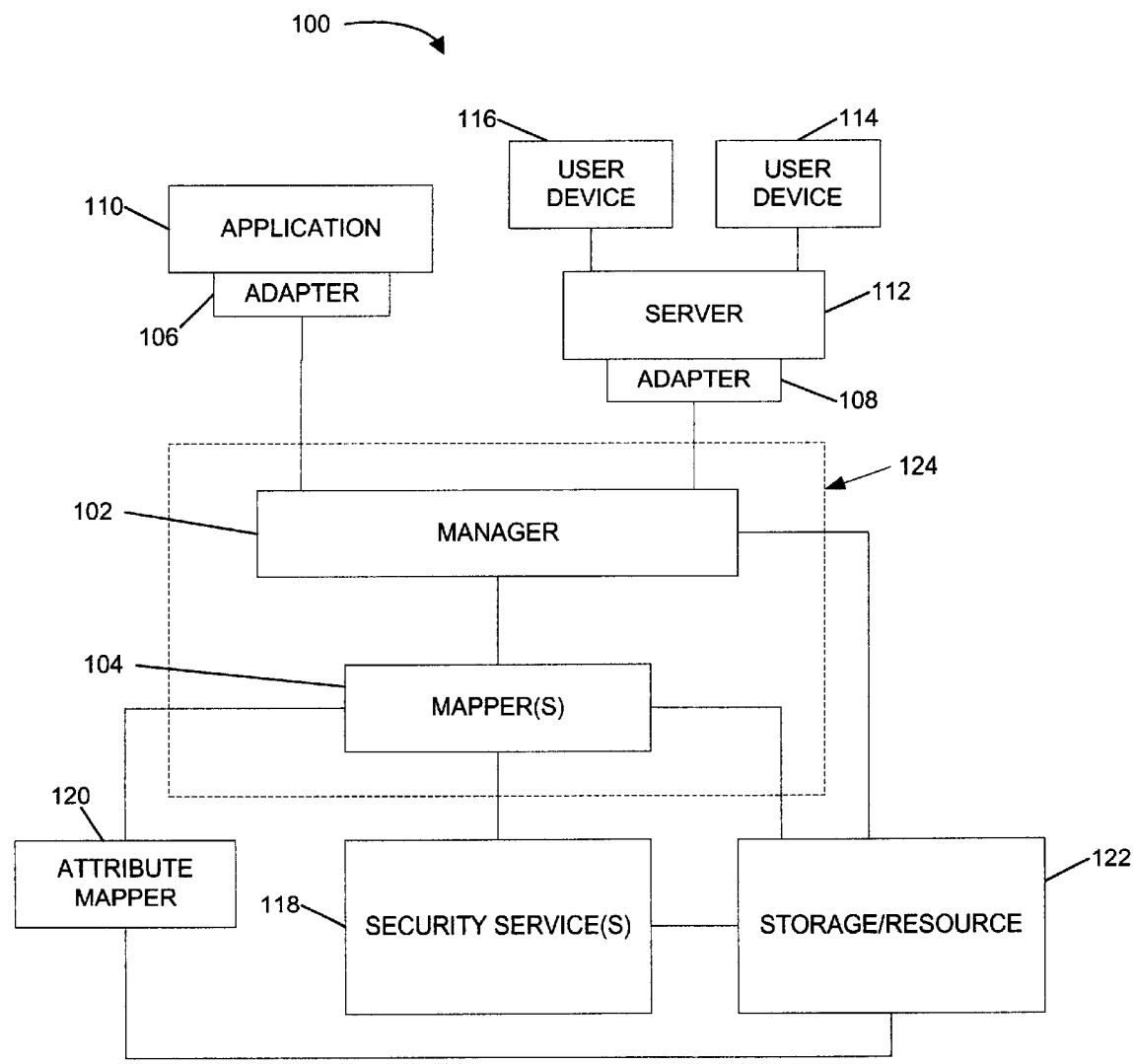
FIG. 1 is a block diagram of system components for an embodiment of an apparatus in accordance with the present invention.

Now referring to FIG. 1, an apparatus, network or system 100 usable with the methods disclosed herein is illustrated. The apparatus 100 includes a manager (also referred to herein as a manager module) 102 in communication with one or more mappers (also referred to herein as mapper modules) 104 and one or more adapters (also referred to herein as adapter modules) 106, 108 for facilitating processing of security requests that may be associated with an application 110 or an application operating on a server 112. The terms "adapter", "adapter module", "manager", "manager module", "mapper" and "mapper module" are used herein for purposes of convenience of explanation and reference and are not used to imply or require, and do not imply or require, any specific limitation(s) regarding their structure, operation, implementation, configuration, etc.

The server 112 may allow access to the application 110 or other applications to users via user devices 114, 116. As will be discussed in more detail below, a security request associated with the application 110 may be intercepted or otherwise identified by the adapter 106 and routed via the manager 102 and one of the mappers 104 to an appropriate security service (also referred to herein as "security module") 118 for processing. A response created by the security service regarding the security request may then be routed back via the appropriate mapper 104, manager 102 and adapter 106 to the application 110.

As a more specific illustration of how the system may be used, the adapter 106 may be associated with the application 110 such that adapter 106 can intercept or otherwise identify a security request initiated by or on behalf of the application 110.

The term "intercept" and its various other forms are used herein for purposes of convenience of explanation and reference and are not used to imply or require, and do not imply or require, any specific limitation(s). As used herein, "interception" or "identification" of a security request by the adapter 106 may include, but is not limited to, situations where the adapter 106 monitors or checks one or more data streams from or to the application 110 and intercepts, grabs, extracts, identifies a security request or data indicative of a security request associated with the application 110 (e.g., a security request initiated by the application 110 or an environment associated with the application 110). For example, the adapter 106 may be inserted into the data flow to and from the application 110, thereby associated the adapter 106 with the application 110. In some embodiments, a security request may form part of a broader or more general request associated with an application.

Once the adapter 106 identifies a security request, the adapter 106 may translate the security request into data in another format (e.g., a SAML (Security Assertion Markup Language) expression) that is independent of the application 110 (e.g., is not necessarily based on any protocol or format used by the application 110 or may vary from any protocol or format used by the application 110) and indicative of the security request. The adapter 106 may then provide the data to the manager 102.

The manager 102 may receive the data indicative of the security request from the adapter 106 and then determine a security service 118 to process the security request. Different security services may be used to process different security requests. Once the manager 102 selects a security service 118 to process the security request, the manager 102 may then provide the data indicative of the security request received from the adapter 102 to the mapper 104 associated with the selected security service 118. In some embodiments, manager 102 may need to load the mapper 104 or cause the mapper 104 to be loaded.

The mapper 104 called by the manager 102 may receive the data indicative of the security request from the manager 102 and prepare a security service version of the security request for use with the security service 118 selected by the manager 102. The mapper 104 may then call the selected security service 118 to process the security service version of the security request. After the security service 118 processes the security request and creates a response to the security request, the security service 118 may provide the response to its associated mapper 104. The mapper 104 may receive the response to the security service version of the security request from the security service 118, the mapper 104 may translate the response into data in another format (e.g., a SAML expression) that is independent of the application 110 and the security service 118. The mapper 104 may then provide the data indicative of the response to the manager 102.

After receiving the data indicative of the response from the mapper 104, the manager 102 may provide the data indicative of the response to the adapter 106. After receiving the data indicative of the response from the manager 102, the adapter 106 may prepare a response regarding security request specific to the application and provide it to the application.

In some embodiments, a mapper 104 may need to use or access an attribute mapper 120 to process the security request or prepare a response to the security request, or to map one attribute to another attribute prior to providing a security request to a security service 118 or providing a response from a security service regarding a security request to the manager 102. In some embodiments, the attribute mapper 120 may include, use or access an attribute mapping or attribute security product. In addition, in some embodiments, the attribute mapper 120 may be considered as a type of security service 118.

A response to the security request created by the security service may then be routed via the mapper 104, manager 102 and adapter 106 to the application 110. Thus, the adapter 106, manager 102 and mapper 104 may constitute all or part of a chain of communication components or modules between the application 110 and the security service 118 and form all or part of a security framework used with one or more for applications and/or security services.

Applications, such as the application 110, may include any type of software program, service, etc., including, but not limited to, payroll applications, document processing applications, accounting applications, messaging applications, design applications, e-commerce applications, database applications, transaction processing applications, customer tracking applications, order tracking applications, Web services, a server based application, a client based application, etc.

In some embodiments, an application itself may generate or initiate the security request. Thus, the application may be a "security aware" application. Security aware applications may create security requests directly so as to access security services that enable the applications to perform security checks as well as to access validate security policies that apply to them.

In other embodiments, an application may be "security unaware" and an operating environment of platform may generate or initiate the security request on behalf of the application. Often, a security unaware application does not specifically call security services, but is still secured by a supporting environment (e.g., an EJB, COM+, MQSeries, or CORBA container). Security for such security unaware applications may be enforced by using interceptors that may call one or more security services on behalf of the applications.

A security request may make or include one or more requests. For example, a security request may request authorization for an application to access or modify a database or other resource, to retrieve information from a database or other resource, etc. The security request may include a description or definition of the type of assertion (e.g., authorization) requested, an identification of the subject of the request (e.g., an individual user making the request), an identification of a resource (e.g., database, document) sought to be accessed, an identification or description of actions desired to perform on or with the resource (e.g., retrieve information, modify information), and/or option evidence or information that may be needed to process the request. A response to such a security request may grant or deny the requested authorization. In addition, the response may include an identification of the subject of the request or response, a validity time (e.g., how long the response, or an assertion contained within the response is valid, an identification of the issuer of the response (e.g., a security service), a digital signature, an identification or description of the resource and action underlying the security request, evidence used, required, or retrieved to make a decision regarding the authorization request, etc.

As another example, a security request may request authentication of a principal (e.g., user, registered system component, application) trying to access a resource (e.g., database, log, file, document). The security request may include a description or definition of the type of assertion (e.g., authentication), requested, an identification of the subject of the request, an identification or description of a confirmation method to be used to conduct the authentication, and/or option evidence or information that may be needed to process the request. Typically, a response to a security request for authentication may be or include a set of one or more credentials that describe the attributes (e.g., role, identity, group, clearance) that may be associated with the authorized principal. In addition, the response may include an identification of the subject of the request or response, a validity time (e.g., how long the response, or an assertion contained within the response is valid, an identification of the issuer of the response, a digital signature, an identification or description of the confirmation used in the authentication process, an identification or description of where the authentication took place, an indicator when the authentication took place, etc.

As another example, a security request may request both authentication and authorization. In some embodiments, this may be considered as one security request while in other embodiments this may be considered as two separate security requests. In addition, a first security service may be used to respond to the authorization portion of the request while a second security service may be used to respond to the authentication portion of the security request. If the first security service uses different attributes than the second security service, the attribute mapper 120 may be called to map the attributes from the first security service into the attributes of the second security service, or vice versa.

In some embodiments; one or more attributes of a user or other principal may need to be retrieved before authentication and/or authorization can be performed. Thus, a security request for authentication and/or authorization may result in a security service being called that can process a request for an attribute. In some embodiments, mapping of an attribute from one security domain into another security domain may be needed to process the security request. Such attribute mapping may be conducted by the attribute mapper 120. In some embodiments, a security domain may be or include a security technology domain and/or a security policy domain.

A security technology domain may contain a collection of services that all use a common security technology. Examples of a security technology domain include Web server security products, mainframe security products, and ORB/OTM/EJB security products. Generally, all of the services with a given security technology domain may interoperate securely because they all use the same security technology. On the other hand, two services in different security technology domains may not be able to interoperate securely because they used different security mechanisms.

A security policy domain may define a collection of service that obey a common security policy. For example, a security policy might specify that all-of the services in one policy are accessible by everyone, whereas in another security policy domain access to the services may be restricted to administrators. A security policy domain may span multiple security technology domains.

In some embodiments, after a security request is handled or processed, the application 110 may be able to use or access a database, storage or other resource 122. Similarly, in some of the methods, the manager 102, a mapper 104, a security service 118, the attribute mapper 120, or some other device, software program, or entity may use or access the storage/resource 122. In some embodiments, the storage/resource 122 may act as a persistent store and maintain or store information regarding security policies, users or other principals, configuration information, attribute information, credential information, etc.

The security service 118 may include one or more security packages, products or programs, some or all which may be provided by the same or different vendors, implemented on the same or different platforms, etc. In some embodiments, a security service may be or provide a cryptography product, an accountability product (which may be or include an audit product, a non-repudiation product, and/or an intrusion detection product), an administration product, an authentication product, an authorization product, an attribute retrieval product, etc.

As will be discussed in more detail below, in some embodiments, a system or security framework for facilitating security in a network may include the adapter 106, the manager 102, and/or the mapper 104, wherein the adapter 106 may intercept a security request associated with an application, provide data indicative of the security request to the manager 102, and provide a response to the application regarding the security request after receiving data indicative of the response from the manager 102. Furthermore, the manager 102 may receive the data indicative of the security request from the adapter 106, select or otherwise determine a security service 118 to process the security request, provide the data indicative of the security request to the mapper 104 associated with the selected security service, and provide data indicative of the response to the adapter 106 after receiving the data indicative of the response from the mapper 104. In addition, the mapper 104 may receive the data indicative of the security request from the manager 102 and/or be loaded by the manager 102, prepare a security service version of the security request based on the data received from the manager 102, call the security service 118 selected by the manager 102 to process the security service version of the security request, receive a response to the security service version of the security request from the security service 118, and provide data indicative of the response to the manager 102.

In some embodiments, a security administration dashboard, console, etc. may be used to register an application and/or a security service with a security framework; to map security requests to security services that can respond to the security requests; to map attributes from one security service or domain into another security service or domain; to help security administrators implement and establish security policies; to help security administrators add or modify principals, resources or attributes; to help security administrators establish and modify resource access control lists; to help security administrators or systems staff view enterprise or system security policy and/or the runtime status of a security configuration; to help define or implement a security architecture using the security framework components or modules (e.g., adapter, mapper, manager) discussed herein; to allow the definition, implementation and/or monitoring of security policy elements; etc. In some embodiments, the dashboard may communicate with, control or modify the manager 102 to regulate or establish the routing of security requests to mappers and the routing of responses to the security requests to the appropriate adapters. In addition, in some embodiments, the dashboard may manage and coordinate security policies implemented using one or more security framework components or modules.

An example of using an adapter to associate an application with the security framework is registering Microsoft's' IIS Web Server™ software. The adapter may be programmed as a dll. In a case where the Microsoft® system does the authentication in its native manner and the adapter is used to get a SAML attribute assertion from the manager, the adapter dll may use the standard Microsoft® ASAPI protocol to register itself as an extension of the Microsoft® system IIS. The may put the adapter dll in the IIS data flow path just after the IIS has authenticated the user and before control is returned to the IIS to pass the SAML attribute assertion, which was obtained from the manager, to the next application in the invocation path.

The related mapper, which is in the manager process, is called by the manager when the call from the adapter for a SAML attribution assertion is received by the framework manager. The mapper takes the generic request for attributes from the request and translates them into an LDAP call to the Microsoft® active directory to retrieve the original user's attributes. The retrieved attributes are transformed into a generic response and returned to the adapter. In this scenario the mapper is using the Microsoft® security service, specifically the Microsoft® active directory, as the security service.

In some embodiments, the manager 102 and the mapper (s) 104 may be located in or operated by the same device or system, as indicated in FIG. 1 by the box 124. The device or system also may include the attribute mapper 120. In some embodiments, a mapper 104 may form part of the manager 102. In some embodiments, the manager or manager module 102 and/or the mapper or mapper module 104 may comprise or be implemented by hardware and/or software.

In some embodiments, different mappers 104 may be associated or used with different security services 118. For example, the system 100 may include a mapper that is used with the attribute mapper 120 for attribute mapping between security domains and a separate mapper that is used with a security service for processing authorization type security requests.

In addition, some or all of the application 110, the adapter 106, the security service(s) 118, the attribute mapper 120, and the storage/resource 122 also may be located in or operated by the same device or system. In some embodiments, the adapter or adapter module 106 may comprise or be implemented by hardware and/or software. In some embodiments, the adapter 106, manager 102 and/or the mapper 102 may be located in or operated by the same device or system.

Figure 2:
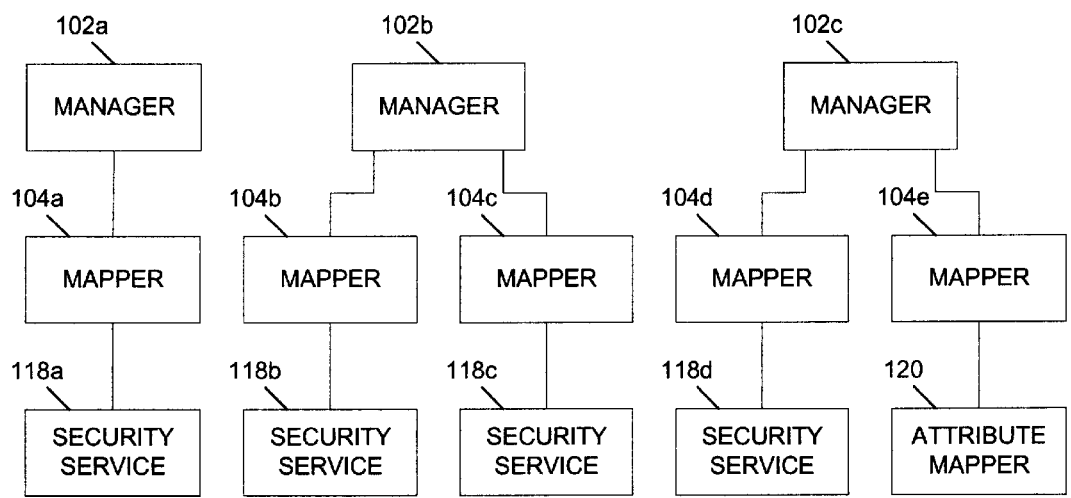
FIG. 2 is a block diagram expanding on the manager, mapper and security services of FIG. 1.

In some embodiments, the manager 102 in the system 100 may comprise one or more independent managers 102a, 102b, 102c, etc., as illustrated in FIG. 2. Different managers may be associated with different adapters. In addition, different managers may be associated with different mappers that are themselves associated with different security services. For example, a manager 102a may be associated with a mapper 104a, which is in turn associated with a security service 118a. The security service 118a may be or include a security service directed to processing authorization type security requests. A manager 102b may be associated with mappers 104b and 104c, which are in turn associated with security services 118*b* and 118*c*. The security service 118*b* may be or include a security service directed to processing authorization type security requests while the security service 118*c* may be or include a security service directed to processing authentication type security requests. A manager 102*c* may be associated with mappers 104*d* and 104*e*, which are in turn associated a security services 118*d* and the attribute mapper 120. Different managers 102*a*–102*c* may be in communication with different adapters. Electronic addresses for different managers, adapters and mappers may be stored in a database or locator, which can be accessed or used by the managers, adapters and mappers to determine the addresses to which to send a specific communications.

The user or client devices 114, 116 preferably allow entities to interact with the device 124 and the remainder of the apparatus 100. The user devices 114, 116 also may enable a user to access Web sites, software, databases, printers, file servers, or other electronic or online resources. Possible user devices include a personal computer, portable computer, mobile or fixed user station, workstation, network terminal or server, cellular telephone, kiosk, dumb terminal, personal digital assistant, browser enabled devices, Web appliances, etc. In some embodiments, information regarding one or more users and/or one or more user devices may be stored in, or accessed from, a user information database and/or a user device information database.

Figure 3:
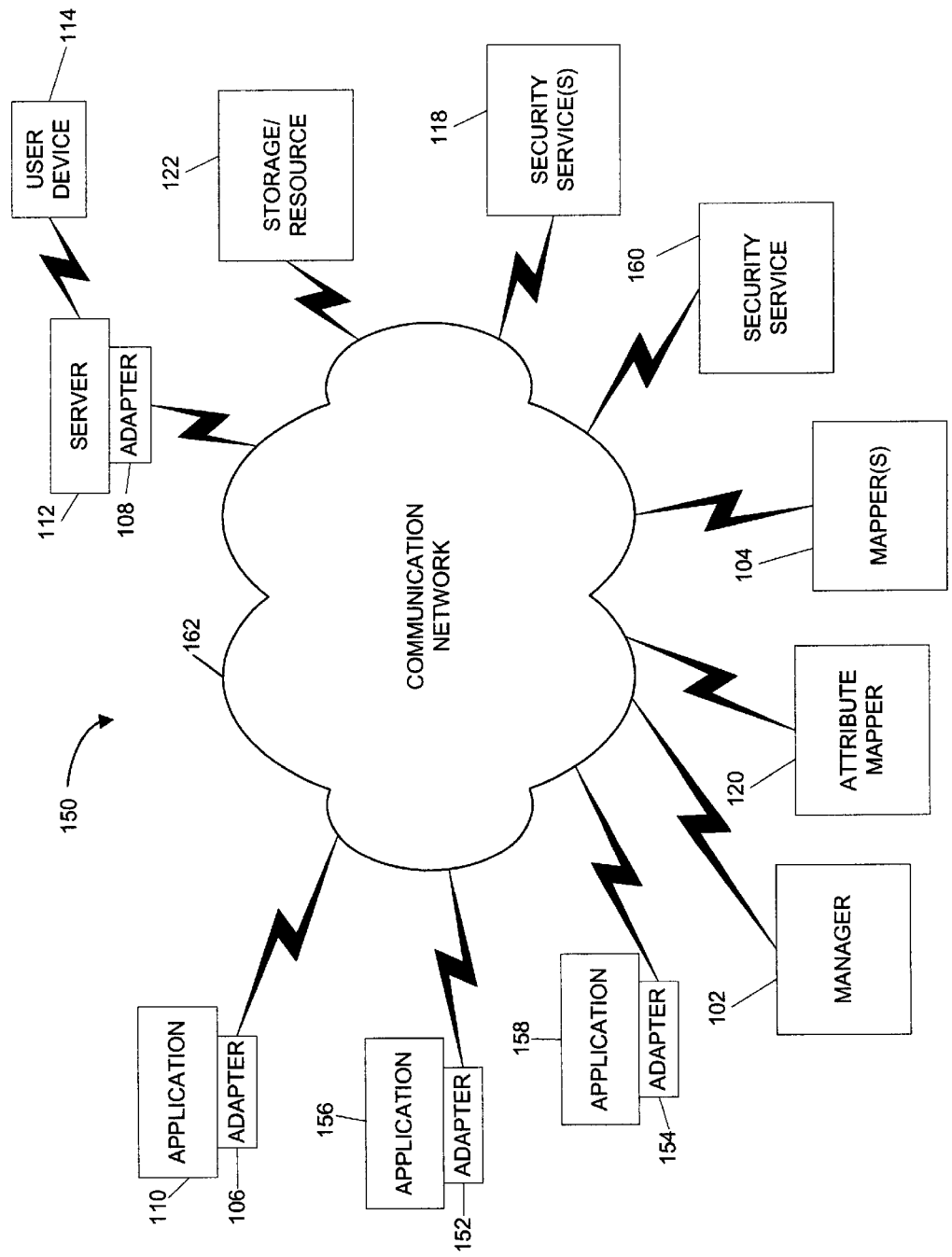
FIG. 3 is another block diagram of system components for another embodiment of an apparatus in accordance with the present invention.

In some embodiments, some or all of the components of a system 150 may be distributed, as illustrated in FIG. 3. The system 150 includes adapters 106, 152 and 154 that facilitate security requests from or associated with applications 110, 156 and 158, respectively. The adapters, 106, 152 and 154, along with the manager 102 and the mapper 104, facilitate communication of the security requests to the security services 118 and/or security service 160 and responses thereto via a communications network 162. The communications network 162 might be or include the Internet, the World Wide Web, or some other public or private computer, cable, telephone, client/server, peer-to-peer, or other communications network or intranet, as will be described in further detail below. The communications network 162 illustrated in FIG. 3 is meant only to be generally representative of cable, computer, telephone, peer-to-peer or other communication networks for purposes of elaboration and explanation of the present invention and other devices, networks, etc. may be connected to the communications network 162 without departing from the scope of the present invention. The communications network 162 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology.

Many different types of implementations or hardware/software configurations can be used in the systems 100, 150 and with the methods disclosed herein and the methods disclosed herein are not limited to any specific hardware/software configuration for the systems 100, 150 or any of its components. For example, in some embodiments, an adapter may be associated with more than one application or environment, and vice versa. Similarly, in some embodiments, a mapper may be associated with more than one security service, and vice versa.

Another example of associating an adapter to an application may use the WebLogic™ application server from BEA. An adapter can be written as a Java filter for servlets in the WebLogic™ application server. The filter maybe a simple Java class that receives a call from, for example, Microsoft IIS Web Server™ software. The adapter can call a manager to perform authorization of the calling principal as to whether the principal can access the particular servlet. When a call is received by the manager, the call may be routed to an authorization mapper that translates the generic request for authorization to the specific authorization APIs of a security service.

In some embodiments, a plug-in kernel or module may be used to install adapters, mappers, and/or managers or otherwise associate an application with an adapter and/or a security service with a mapper. In order to simplify the process, structure and operation of the kernel, the kernel may support or implement a narrow range or number of operations involved in bootstrapping a process and loading one or more service modules into it. The kernel may not need to know much, if anything, about the security framework component or module it is building or establishing. In addition, the kernel may allow calling and loading of other plug-ins in support of building components or modules of a framework architecture, application executables, etc. A kernel itself may be very small and provide limited functionality. In some embodiments, a kernel may be able to load service modules and manage dependencies among the service modules so as to allow collections of inter-dependent service modules to be assembled into a dynamically configurable executable that may function as an adapter, a mapper, a manager, etc.

In some embodiments, a plug-in kernel may be established for each module (e.g., adapter module) in a security framework. A kernel may use a small set of core facilities (e.g., loading, reusing or discarding plug-in services) modeled or operating in a platform and storage independent manner. These facilities may be available to components as they are loaded and run by the kernel, thereby allowing resolution in dependencies in the components themselves during their initialization process or at runtime. For example, the kernel may support loading and configuration of adapter, manager and mapper security modules or components described previously above. Each of the components may be comprised of service modules, e.g., an adapter may include application specific service modules (e.g., an application server Java filter) as well as generic framework service modules (e.g., a parser for creating a standard XML (Extensible Markup Language representation of a security request). The kernel preferably ensures that a service module is loaded and configured before a second service module is loaded and configured that is dependent on the first sub-component.

Multiple plug-ins may have overlapping dependencies, the kernel may evaluate the dependencies to determine what service modules can be shared among other components. For example, the kernel may ensure that a parser for creating a standard XML representation of a security request will be shared by many components rather than reloaded multiple times.

In some embodiments, a kernel may start up as executable code that is loaded onto a device. For example, an application may be stored and operating on a device. A kernel may comprise software loaded onto or stored in the device. A computer or some other device, the manager 102, or some other hardware or software may invoke, initiate or call the kernel in order to initiate an adapter module stored on the device and associate it with the application such that the adapter can intercept security requests and/or monitor other communications to and from the application. Once the adapter module is created or otherwise established, the kernel may stop execution. A similar process may be used to establish a mapper module and associate the mapper module with a security service.

In some embodiments, a kernel may contain some limited configuration information. For example, a kernel may contain enough data to guide the kernel to construct an adapter versus a manager. As another example, a kernel may contain location information regarding where it can access additional instructions. The location information may vary depending on whether or not the kernel is being used to build an adapter, a mapper, the application an adapter is being built for, the security service a mapper is being built for, etc. Once activated, the kernel may retrieve information to further determine how to configure or operate itself (e.g., determine what calls to what service modules the kernel should make).

In some embodiments, a kernel may expose two primary interfaces: a configuration object and a runtime kernel. The configuration object may be or include a collection of configuration information conforming to a known schema. For example, a configuration object may describe the service modules needed to assemble an adapter, manager, or mapper. A runtime kernel may be or include a set of operations accessible to service modules. For example, a runtime kernel may provide several behaviors. For example, a behavior may include "create configuration object" where a factory method (function) is exposed that creates empty configuration objects. As another example, a behavior may include "get Service Instance" where a collection of operations provide creation and location behavior for management of loaded service modules. As a third example, a behavior may include a "propagate command" which includes a collection of operations that provide the means to propagate commands to and gather information from loaded components.

There may be loadable service modules associated with a kernel. For example, service module types directly supported by the kernel may include controller, action, and service. These service module types may generate events, act upon those events, and add application services, respectively.

Security framework components may be associated with a factory. A factory is a module for creating instances of service module interfaces using a configuration object as input. For example, a manager component may be associated with a factory interface for creating the service modules that embody manager functionality. The factory may be specified by name to the kernel, which in turn loads an instance of the factory and invokes its create operation with the appropriate configuration object. This two-step creation process for components provides flexibility useful in implementing the kernel in multiple languages, on multiple platforms, etc.

A service module factory preferably does not return an ill-formed service module. To the extent possible all conditions necessary for the proper functioning of a service module should be verified before the service module is returned to the kernel by the factory. The interfaces specified for interaction with the kernel work primarily with generalized data types and behavioral constraints. This approach allows implementation specifics to be hidden to the greatest possible degree and is necessary to support the flexibility goals of the kernel.

The service module factory interface is the base interface for all loadable service modules, including controller and action, and may be implemented by the kernel. It exposes the following behaviors: (1) report, a collection of operations for reporting the instance's configuration, attributes and status; and (2) reconfigure, an operation supporting a request that the instance reconfigure itself with a new configuration object.

These operations may be specified as method (function) signatures with minimal constraints on their behavior. Broad latitude may be given to an implementer regarding the specifics of each operation. For instance, beyond a few constants defined by the kernel, the information returned by the reporting methods (functions) may be determined by the implementation of the instance. Whether the instance is reconfigurable at all, or what information may be needed to reconfigure it is also at the discretion of the implementer. The behavior and requirements of these operations may be described in the documentation of the component; as the kernel preferably is unaware of semantics beyond those it requires.

An instance of the controller factory interface may initiate operations. Controllers may be or include objects that are started and stopped by the kernel. A security framework component preferably includes at least one controller. In general, the controller interface represents an actor or a boundary between a process and some external actor. The controller interface may add the following behavior to the service interface: (1) start, which starts the controller, possibly on a new thread (once started, the controller may begin initiating operations at any time); and (2) stop, which stops the controller from initiating further operations.

Once the kernel has loaded all service modules in its initial configuration, it may invoke the start method (function) on each controller object of which it is aware, in an order determined by evaluation of their dependencies. Upon receipt of a stop command, which may come in a number of forms, the kernel may invoke the stop method (function) on each controller of which it is aware, again in an order determined by their dependencies. It is possible that the working set of controllers in an application may change during execution, and this change may be accommodated by the kernel.

An instance of the action factory interface may respond to a request by performing some operation on, or dictated by, a target object. In general, actions usually carry out some unit of work initiated by a controller. The action interface may add the following behavior to the service module interface: perform, which performs some operation on an object, possibly returning a result.

In some embodiments, the kernel may be started just as any application in the implementation language is started. The kernel may accept arguments providing it with the configuration to initialize itself with or a reference to a bootstrap factory that will provide it with the necessary configuration data or other information. In the latter case, the bootstrap factory instance may use the service modules of the kernel to load some needed application services allowing it to obtain the requested configuration.

Each service module used in the kernel may have associated with it a number of attributes that serve to describe its capabilities and requirements, and the set of attributes describing a service module to the kernel for startup purposes is embedded in a configuration stanza. These stanzas can be nested to any depth, and the entire configuration of an instance of the kernel (an application) is just an outer stanza encompassing several other stanzas.

Within the configuration stanza for a service module may be configuration information that the kernel, the target service module or its factory uses to determine that additional service modules need to be loaded. If this information is expressed at the level parsed by the kernel then the kernel makes sure the dependency is met before creating the service module and includes in the service module configuration passed to the service module's factory a reference to the service module that fulfills the dependency requirement.

Failure of a factory to create a well-formed service module instance is conveyed to the kernel by means of an exception. Any exception received by the kernel during this initialization phase causes the kernel to unload already loaded service modules and exit.

Service modules may themselves invoke kernel operations to locate other service modules through the kernel's interface, a reference to which is passed to every factory creating a service module. This allows a component to obtain its own full configuration through some means external to the kernel configuration, which then must only contain skeletal rather than complete configuration information for that particular component.

In some embodiments, before loading any service modules, a kernel may install traps to receive notification of asynchronous shutdown or other signals. These traps may be installed prior to loading configured components so that service modules may have the opportunity to alter or override their behavior. Once the kernel has completed loading its configuration, it invokes each controller's start method (function) and then effectively goes to sleep.

Because controllers are expected to operate in their own thread of execution, they run while the kernel waits for some indication that it should shut down the application. Service modules operating on threads created by controllers may still call upon the kernel through its interface, but the main thread of execution lies dormant while such operations are performed on the callers' threads.

As an example of using a kernel to install security components (e.g., adapters, managers, and/or mappers) in a security framework, consider the previously described examples of adapters for the IIS™ Web Server and WebLogic™ application server. On each hardware platform where a security component is required, the same kernel software may be installed; installation of customized kernel software for each platform or security component is not required. When the kernel is initialized, it uses externally provided configuration information to bootstrap, load, and configure itself into the necessary components. In this manner, a kernel that is loaded with an IIS™ Web Server will load a specified set of service modules to configure itself into an adapter for IIS, while the same kernel software loaded with a WebLogic™ application server will load a specified set of service modules to configure itself into an adapter for the WebLogic™ application server. This approach eliminates the need for administrators to custom configure the security for each platform, thus significantly simplifying the configuration task.

Process Description

Figure 4:
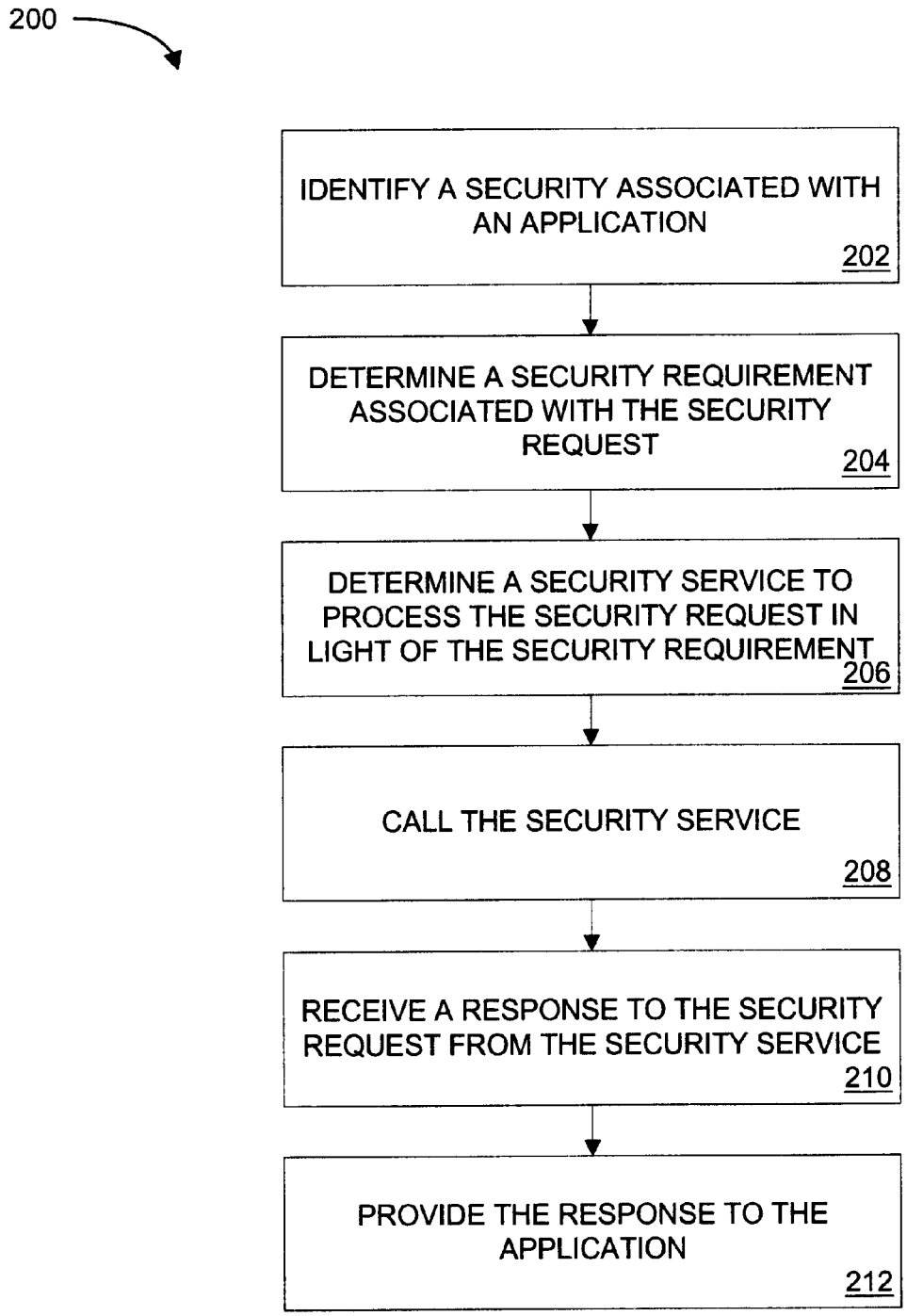
FIG. 4 s a flowchart of a first embodiment of a method in accordance with the present invention.

Reference is now made to FIG. 4, where a flow chart 200 is shown which represents the operation of a first embodiment of the present invention. The particular arrangement of elements in the flow chart 200 is not meant to imply a fixed order to the steps; embodiments of the present invention can be practiced in any order that is practicable. For purposes of explanation, but not limitation, the method 200 will be discussed with particular reference to the system 100 of FIG. 1. In general, the method 200 facilitates the processing of a security request associated with an application such that a response to the security request can be provided to the application.

The method 200 includes a step 202 during which a security request associated with the application 110 is intercepted, identified or otherwise received prior to delivery of the security request to a security service. In some embodiments, the method 200 may include associating an adapter with the application 110 or associating the application 110 with a security framework that will facilitate processing of security requests associated with the application 110. If a security request associated with the application 110 is initiated, the adapter may intercept or otherwise identify the security request during the step 202.

As previously discussed above, in some embodiments the security request may be generated or initiated by the application 110 itself. In other embodiments, the security request may be generated or initiated by an environment or platform associated with the application 110. In other embodiments, the security request may be part of a call to the application 110 that is intercepted or otherwise identified by the adapter 106 prior to reaching the application 110. For purposes of explanation, but not limitation, a security request may be considered to be associated with the application 110 if the security request is initiated or generated by the application 110, if the security request is initiated or generated by an environment associated with the application 110, and if the security request is part of a call to an application 110 or its environment made by another application or device. In some embodiments, an environment may be associated with an application 110 if the application is supported by the environment, the application 110 is running under the control or management of the environment, the application 110 is relying on the environment to perform functions (e.g., security functions) on behalf of the application 110 or otherwise using the environment to perform such functions, and/or the application 110 is unable to fully operate without the environment.

In some embodiments, the method 200 may include recognizing an association of the application 110 with a security framework and/or recognizing an association of a group of at least one security service with the security framework. The security framework may include the adapter 106, the manager 102, and/or the mapper 104.

As previously discussed above, in some embodiments the security request identified during the step 202 may request authentication of a principal; authorization of a principal; approval to access or modify an electronic resource; auditing of a principal's action(s); a change in a security policy associated with a principal; etc., or one or more of these.

In some embodiments, the security request may be intercepted or otherwise identified during the step 202 by the adapter 106, which may be located in or operated by the same device that implements or operates the application 110. While the adapter 106 may be located remotely or separately from the application 110 (or its environment) in some embodiments, security of the overall system 100 and the security request may be enhanced by a tight or local coupling or operation of the application 110 (or its environment) and the adapter 106. In some embodiments, the method 200 may include associating the adapter 106 with the application 110 so as to allow the adapter 106 to intercept security requests associated with the application 110.

In some embodiments, the security request intercepted or otherwise identified during the step 202 may include one or more of the following: data indicative of a type (e.g., authentication, authorization, attribute) of security request; data indicative of subject of the security request; data indicative of a type of assertion (e.g., authentication, authorization, attribute retrieval or mapping) requested; data indicative of a confirmation method to be used to process the security request; data indicative of an action desired to be performed by a subject (e.g., a principal); data indicative of the application 110; data indicative of an environment associated with the application 110; data indicative of a device associated with the application 110; data indicative of a user or other principal associated with 110 application 110; data indicative of at least one attribute associated with the application 110; data indicative of at least one attribute associated with a user or other principal; data indicative of a resource the application 110 wishes to access, modify, etc; data indicative of an action the application 110 wishes to perform; etc.

In some embodiments, the adapter 106 may encrypt, translate, parse or convert some or all of the security request intercepted or identified during the step 202. Such encryption, translation, parsing or conversion may enhance the overall security for the system 100 and/the security request. Moreover, a translation of the security request may allow different transport protocols, communication channels, encoding schemes, etc. to be used for or with communications by and between the adapter 106 and the manager 102. For example, a security request may be in a format or protocol that is specific to, or dependent on, the application 110 or the environment that generated or otherwise initiated it. The adapter 106 may translate or otherwise transform the application specific format or protocol of the security request identified during the step 202 into another proprietary or known format or protocol (e.g., Security Assertion Markup Language (SAML)) that is independent of the application 110 or environment. The application 110 or the environment that created the security request identified during the step 202 does not need to be aware of any encryption or translation of the security request by the adapter 106 and can operate independently of such encryption, conversion or translation. In some embodiments, the adapter 106 may extract data from the security request as part of the encryption, conversion or translation.

In embodiments where multiple adapters are used with multiple applications and/or environments, translation of application or environment dependent or specific security requests into a standard or consistent format or protocol makes it easier for the adapters to communicate with the manager 102 and for the manager to further process the translated versions of the security requests. Thus, the manager 102 does not need to recognize, understand, be aware of, or be able to use, different security request protocols and formats that may be used by different applications or environments. Adapters can be created for each application or environment, or each type of application or environment, while the manager 102 and the mapper 104 remain essentially the same regardless of the applications or environments.

During a step 204, a security requirement associated with the security request identified during the step 202 is determined. For example, the security request may want authentication and/or authorization of a principal, an audit of a principal's action(s), a retrieval or change in an attribute associated with an application, principal, etc.

In some embodiments, the step 204 may be performed by the manager 102. Thus, the method 200 may include a step of the adapter 106 providing the identified security request to the manager 102 and/or the manager 102 receiving the security request from the adapter 106. As previously discussed above, the adapter 106 may encrypt or translate some or all of the security request identified during the step 202 prior to sending any data indicative of the security request to the manager 102.

In some embodiments, the step 204 may include one or more of the following: determining if the security request or the security requirement associated with the security request includes authentication of the application 110, a user or other principal; determining if the security request requests authorization of the application 110, a user or other principal; determining if the security request requests retrieval, confirmation, modification, etc. of an attribute of the application 110, a user or other principal; determining if the security request requests administration of the application 110, a user or other principal; determining if the security request requests auditing of at the application 110, a user or other principal; etc.

In some embodiments, the adapter 106 may be integrated with the manager 102 so that the adapter 106 and the manager 102 comprise a single device and/or a single portion of software for purposes of the step 202 or the method 200.

During a step 206, a security service that can respond to, handle or otherwise process the security request identified during the step 202 is determined. For example, authentication requests from or associated with the application 110 may be handled by a first security service while authorization requests from or associated with the application 110 may be handled by a different security service. Different authorization requests from different applications may be processed by different security services. Similarly, different authentication requests from different applications may be processed by different security services. In some embodiments, the step 206 may include or encompass the step 204.

In some embodiments, a security service may be or include the capability to do one or more of the following: determining if the application can access an electronic resource; determining if the application can access another application; determining if the application can retrieve data identified in the security request; determining if the application can perform an action identified in the security request; etc.

In some embodiments, a security service may be or include the capability to do one or more of the following: authentication of the application, user or other principal; authorization of an application, user or other principal; retrieval, confirmation or modification of an attribute or credential associated with an application, user or other principal; administration of an application, user or other principal; auditing of an application, user or other principal; etc.

In some embodiments, the manager 102 may act as a router or switch that dynamically selects or determines which security service to use or call for a specific service request. In other words, the manager 102 determines which security service should process which service request. Typically, association of a security request with a service may be determined or established in advance and may form some or all of a security policy or security administration associated with applications, security requests, security services, etc. In some embodiments, the method 200 may include determining an association of at least one service request with at least one security service, accessing or establishing a security policy, receiving information regarding a security policy, etc. In some embodiments, information regarding one or more security policies, associations between security requests and security services, etc. may be stored in the storage/resource 122 or some other electronic resource.

In some embodiments, the step 206 may be or include determining a security service that can evaluate the security requirement determined during the step 204 and processing or evaluating the security request in light of the security requirement.

During a step 208, the security service selected during the step 206 is invoked or otherwise called to respond to or otherwise process the security request identified during the step 202. In some embodiments, the method 200 may include associating a mapper with a security service. If the security service is selected during the step 206, the mapper associated with the security service may be used to called or invoke the security service during the step 208.

In some embodiments, the step 208 may include the manager 102 calling the mapper 104 associated with the security service determined during the step 206 by the manager 102 and passing the security request (or an encrypted or translated version of the security request) to the mapper 104 associated with the security service determined during the step 206. More specifically, in some embodiments one or more mappers 104 may be associated with one or more security services. The system 100 may include multiple mappers 104, each of which is associated with one or more different security services. Once the manager 102 determines which security service to use to process the service request received during the step 202, the manager 102 may call, load or invoke the mapper associated with the selected security service and provide the security request, or data indicative of the security request, to the selected mapper. The selected mapper may then call or invoke the selected security service.

In some embodiments, the manager 102 may pass the original security request identified during the step 202 to the mapper 104 associated with the security service selected by the manager 102. In other embodiments, the manager 102 may pass an encrypted or translated version of the security request to the mapper 104. The mapper 104 may translate or map the security information passed to it from the manager 102 regarding the security request identified during the step 202 into specific calls to the security service 118 that can process the security request. For example, if the adapter 106 translates the security request identified during the step 202 into another format or protocol (e.g., SAML), the manager 102 may provide the same translated version of the security request to the mapper 104. In either situation, if necessary, the mapper 104 may then translate the data received in the communication received from the manager 102 into a security request that can be used, understood or otherwise accepted by the security service determined during the step 206. Thus, the security request may be translated into a format or protocol that is specific to or dependent on the security service. The mapper 104 may then pass the security service specific version of the security request to the security service as part of the step 208.

In some embodiments, the security request identified during the step 202, or processing of the security request by a security service, may request or require that an attribute from one security service or domain be mapped into an attribute for a different security service or domain so as to facilitate processing of the security request identified during the step 202 by the security service identified during the step 206. In some situations, one of the mappers 104 may call or use the attribute mapper 120 to conduct such attribute mapping. Such attribute mapping may allow semantic translation of the credentials or other attributes of users or other principals across the different security services and allow security requests initiated in one security domain to be processed and responded to by a security service in a different security domain.

In some embodiments, the mapper 104 or the attribute mapper 120 may need to access or use attribute, attribute mapping, security service specific data, an external generic attribute service, mapping policies established by a security administrator, or pointer information to call the selected security service, prepare a security request for the security service, respond to an attribute type security request, etc. Thus, the mapper 104 or the attribute mapper 120 may access or use the storage/resource 122 or some other electronic resource, software and/or hardware device, etc. to access the attribute or attribute mapping information, invoke attribute mapping functions or algorithms, etc.

The security service that responds to the security request identified during the step 202 does not need to be aware of any encryption, conversion or translation of the security request by the adapter 106, manager 102, and/or mapper 104 and can operate independently of such encryption, conversion or translation so long as it receives the security request in a format it can understand, use and process. Thus, in general, the application 110 and the security services 118 can operate without knowledge of the formats or protocols used by the other to generate, receive, process, or respond to security requests, and responses thereto. Thus, the system 100 allows or facilitates the use of applications and security services that are from different vendors, that use different communication or transport formats or protocols, etc. while encryption and/or translation of security requests and/or responses remains transparent to such applications and security services.

During a step 210, a response to the security request identified during the step 202 is received. In some embodiments, the method 200 may include generating some or all of a response to the security request identified during the step 202. Alternatively, in some embodiments, the mapper 104 may receive a response to the security request from the security service called during the step 208. The method 200 allows the use of of-the-shelf or otherwise available security services. In order to process some security requests, a security service may need to access the storage/resource 122 or some other electronic resource.

In some embodiments, the step 210 may be or include one or more of the following: receiving data in a security service dependent format and indicative of the response; receiving data indicative of whether the application 110 can perform an action indicated in the security request; receiving data indicative of a credential associated with a principal; receiving data indicative of whether the application 110 can access a resource indicated in the security request; receiving data indicative of the security service; receiving data indicative of a device associated with the security service; receiving data indicative of a denial of the security request; receiving data indicative of an approval of the security request; receiving data indicative of a time the response is valid; receiving data indicative of a subject of the security request; receiving data indicative of a confirmation method used to process the security request; receiving data indicative of a resource; receiving data indicative of a time the security request was processed; receiving data indicative of where the security request was processed; etc.

During a step 212, the response or a variation of it (also referred to as the response) received during the step 212 is provided to the application 110, or its associated environment, that generated the security request identified during the step 202. In some embodiments, the response may be routed back to the application 110 or its associated environment via the same or a different delivery path or communication channel than was used to provide the security request to the security service. For purposes of the present invention, providing a response to an application includes, but is not limited to, providing the response to an environment associated with the application and/or providing the response to a device or a software program that made a call to the application that included the security request identified during the step 202.

In some embodiments, a response to the security request identified during the step 202 may include one or more of the following: data indicative of a time the response is valid; data indicative of a subject of the security request; data indicative of a confirmation method used to process the security request; data indicative of a resource; data indicative of a time the security request was processed; providing data indicative of where the security request was processed; data in a security service dependent format and indicative of the response; data indicative of whether the application 110 can perform an action indicated in the security request; data indicative of whether the application 110 can access a resource indicated in the security request; data indicative of a request for additional information from the application 110; data indicative of a request for additional information from an environment associated with the application 110; data indicative of a credential associated with a principal; data indicative of the security service; data indicative of a device associated with the security service; data indicative of a denial of the security request; data indicative of an approval of the security request; etc.

In some embodiments, the step 212 may include one or more of the following: providing data indicative of a time the response is valid; providing data indicative of a subject of the security request; providing data indicative of a confirmation method used to process the security request; providing data indicative of a resource; providing data indicative of a time the security request was processed; providing data indicative of where the security request was processed; providing the response to the application 110; providing the response to an environment associated with the application 110; providing data in an application or environment dependent format and indicative of the response; providing data indicative of a credential associated with a principal; providing data indicative of whether the application 110 can perform an action indicated in the security request; providing data indicative of whether the application 110 can access a resource indicated in the security request; providing data indicative of the security service; providing data indicative of a device associated with the security service; providing data indicative of a denial of the security request; providing data indicative of an approval of the security request; providing the response to an adapter associated with the application 110 or to an environment associated with the application 110; etc.

In some embodiments, the mapper 104 may receive the response from the security service and pass or forward some or all of it to the manager 102. The manager 102 may then pass or forward some or all of what it receives from the mapper 104 to the adapter 106, which in turn may pass or forward some or all of what it receives to the application 110 or an environment associated with the application 110.

In some embodiments, the mapper 104 may receive the response from the security service during the step 210 and encrypt, convert, parse or translate some or all of the response. Such encryption, conversion, parsing or translation may enhance the overall security for the system 100 and/or the response. Moreover, a translation of the response may allow different transport protocols, communication channels, encoding schemes, etc. to be used for or with communications by and between the mapper 104 and the manager 102. For example, a response may be in a format or protocol that is specific to, or dependent on, the security service that created the response. The mapper 104 may translate or otherwise transform the security service specific or dependent format or protocol of the response into another proprietary or well-known format or protocol (e.g., Security Assertion Markup Language (SAML) that is independent of the security service. The security service that created the response received during the step 210 does not need to be aware of any encryption, conversion or translation of the response by the mapper 104 and can operate independently of such encryption, conversion or translation.

As another example, a user may be represented by one or more attributes associated with the user. Example attributes include: customer, manager, etc. In some embodiments, different security services and/or applications may use different semantics and syntax for what are intended to be the same attribute. This may occur when, for example, different security services and/or different applications are in different security domains. For example, one security service may use the attribute "manager" for a particular role that might be assigned to a user while another security service might use the attribute "boss" to represent the same role for the same user. Moreover, different applications or other security services may use different terms, semantics or syntax to represent the same attribute. As a more specific example, an attribute in a Microsoft Windows® software environment may be represented by a hierarchical group represented by a Domain Name, e.g., DN=mgr, OU=engineering, DC=win2k, o=Quadrasis, while an EJB (Enterprise Java Bean) may represent the same attribute by the role "boss". The mapper 104 may use or call the attribute mapper 120 to map the attribute "boss" to the attribute represented by such hierarchical group or to an attribute used by a security service.

The mapper 104 or the attribute mapper 120 may relate or otherwise map different semantics and syntaxes used by different applications and/or security services when translating or transforming the data received from the manager 102 in order to create security requests that are understandable, recognizable and usable by the security service that processes the security request. Thus, the application 110 that generates the security request does not need to be aware of the attributes, language, format, etc. used by a security service to process the security request and does not need to map or convert attributes used by the application 110 with attributes used by the security service. Similarly, the security service that generates a response to the security request does not need to be aware of the attributes, language, format, etc. used by the application to create the security request and does not need to map or convert attributes used by the security service with attributes used by the application 110.

In some embodiments, a security administrator may equate or map an attribute defined, semantically and syntactically in one security domain, with an attribute from another security domain or service. Such mapping information may be available to, and used by, the mapper 104 and/or the attribute mapper 120, particularly when involved in an attribute type security request. Thus, in some embodiments, the method 200 may include mapping an attribute from one security domain from one security service to an attribute in another security domain as part of responding to a security request or providing a security request to a security service. In some embodiments, the mapper 104 and/or the attribute mapper 120 may need to access or use the storage/resource 122 or other electronic resource (e.g., database, pointer list) to obtain or retrieve attribute mapping information or algorithms used in such mapping.

In some embodiments, an additional level of attribute mapping may be used by the attribute mapper 120 or the system 10. In the additional level of mapping, a generic permission may be used that is or includes an attribute defined by an authority that two or more co-operating entities may recognize and use as a definitive repository of the defined attributes. For example, a group in a Microsoft Window® software based security service may be mapped by a security administrator to a generic permission, (e.g., "manager") defined in authority recognized by the enterprise implementing the security service. The role of "boss" in an application in an EJB based security service belonging to the same or a different enterprise may be mapped to the generic permission of "manager". Attributes in any security system with different syntax of different representations of the attribute also will be mapped to the generic permissions attributes in the authority that they recognize and have been associated. The mapped generic permission may then be passed from one security technical domain, which is making a security request (e.g., the security domain that includes the application 110), to a different target security domain that is receiving the security request. The target security domain may use attribute mapping to transform the generic permission associated with the security request, or an attribute associated with the security request, to the specific and applicable attribute in the target security domain. The attribute mapped into the language of the target security service may then be used directly by the security domain.

In some embodiments, mappings or mapping information between a domain specific attribute and a generic permission may be stored in the storage/resource 122 or some other electronic resource for use by the mapper 104, the attribute mapper 120, the manager 102 or some other entity or device. In addition, in some embodiments, the mappings may be bi-directional. That is, a specific attribute may be mapped to a generic permission and a generic permission can be mapped to a specific attribute in a specific security domain.

In some embodiments, in addition to using a specific attribute of a target security domain that had been mapped from a generic permission for use in an authorization service of the target security domain, the mapped generic permission may be used directly by an authorization service that uses the semantics and syntax of the generic permission. For example, the American Medical Association may develop a set of generic attributes that are specific to the medical community. Thus an attribute mapper associated with some entity could transform the specific attributes of a user to the generic attribute of defined by the American Medical Association and send this as part of a request to a hospital. The hospital recognizing the generic attributes defined by the American Medical Association would use the generic attributes directly. . In order to use the later functionally, the generic permission may be comprised of the permission itself and the security domain in which the generic permission is defined and supported. In a simplified situation, a first security technology domain may be used to define its specific attribute mapping as the generic mapping. In such a situation, other security technology domains in a symbiotic grouping of security technology domains that include the first security technology domain, may map their attributes to those of the first security technology domain (which may be considered as the dominant security technology domain).

In embodiments where multiple mappers and/or multiple security services are used, translation of security service dependent or specific responses into a standard or consistent format or protocol may make it easier or more efficient for the mappers to communicate with the manager 102 and for the manager to further process the translated versions of the responses. Thus, the manager 102 does not need to be aware of, or be able to use, different security service protocols and formats that may be used by different security services. Mappers can be created for each security service, or each type of security service, while the manager 102 and the adapter 106 remain essentially the same regardless of the different security services.

In some embodiments, if the mapper 104 creates a security service independent version of the response received during the step 210, the mapper 104 may forward the translated version of the response to the manager 102, which in turn may pass or forward some or all of the translated version of the response to the adapter 106. The adapter 106 may then create a version of the response specific to the application 110 as part of the step 212.

In some embodiments, the adapter 106, manager 102 and/or the mapper 104 may forward a security request to a security service even if the security request does not contain all of the information needed by the security service to process the security request. For example, a security request initiated by the application 110 and intercepted by the adapter 106 may request authorization of a principal to access a specific resource, but not provide all of the information needed (e.g., attribute information) needed for a security service to process the security request. In some embodiments, the adapter 106, manager 102 and the mapper 104 may pass the security request to the security service. The initial response to the security request created by the security service may simply notify the application 110 that the application 110 must provide more information before the security service can process the security request. As a result, the security service may deny the authorization request. If the application then provides the needed information, the security service may then respond to or process the security request more completely.

In some embodiments, the adapter 106, the manager 102 and/or the mapper 104 may have a certain degree of intelligence built into them. For example, using the previous example where the security request initiated by the application 110 does not include all of the attribute information needed to process the security request, either the adapter 106, the manager 104 or the mapper 102 may delay delivery of the security request to the security service and request that the application 110 provide the needed information. Once the needed information is received, the security request may then be presented to the security service or to the next component in the chain of communication.

In some embodiments, a security request may request two or more things. For example, the security may request both authentication and authorization of a principal. In some embodiments, the adapter 106, manager 102 and/or the mapper 104 may treat the security request as a single security request and forward it to a security service. In other embodiments, the adapter 106, manager 102 and/or the mapper 104 may parse the security request into separate security requests and forward them individually via the chain of communication. In addition, the adapter 106, manager 102 and/or the mapper 104 may then combine responses to the two created security requests before providing them to the application 110 or to the next component in the chain of communication.

In some embodiments, the method 200 may include establishing or using a mapping that maps a security request associated with an application to a security service that can process the security request. Such mapping or mapping information may be stored in or used by the manager 102 to determine which security service to use to process the security request identified during the step 102.

In some embodiments, the method 200 may include establishing a mapping that maps a security request associated with an application to one or more of the following actions: authentication of an application, user or other principal; authorization of an application, user or principal; retrieval, confirmation or modification of an attribute of an application, user or other principal; administration of an application, user or other principal; auditing of an application, user or other principal; etc.

In some embodiments, the method 200 may include associating one or more applications, environments and/or security services with a security framework. The security framework may include an adapter, manager and/or mapper as previously discussed above.

In some embodiments, a device, software program, or entity may implement the steps of the method 200 or cause them to occur. For example, in some embodiments, a method for facilitating security in a network may include causing a security request associated with an application to be interrupted; causing a security requirement associated with the security request to be determined; causing a security service that can evaluate the security requirement for the security request to be determined; causing the security service to be called; causing a response from the security service to the security request to be received; and causing the response to be provided to the application and/or an environment associated with the application.

Figure 5:
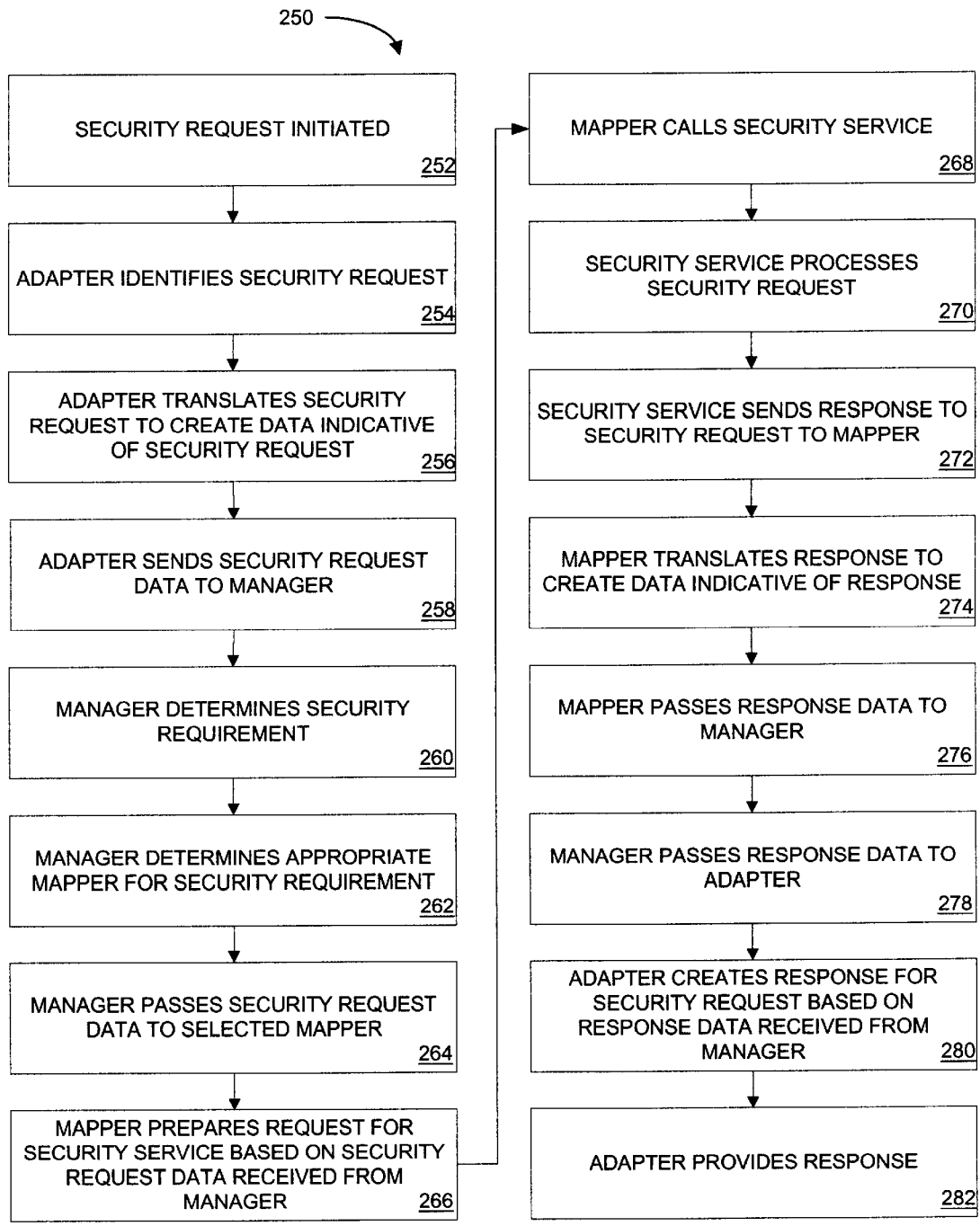
FIG. 5 is a flowchart of a second embodiment of a method in accordance with the present invention.

Reference is now made to FIG. 5, where a flow chart 250 is shown which represents the operation of a second embodiment of the present invention. The particular arrangement of elements in the flow chart 250 is not meant to imply a fixed order to the steps; embodiments of the present invention can be practiced in any order that is practicable. In addition, in some embodiments, two or more of the steps of the method 250 may be combined if practicable. For purposes of explanation, but not limitation, the method 250 will be discussed with particular reference to the system 100 of FIG. 1.

Processing begins at a step 252 during which the application 110, or environment associated with the application 110, or some other device or software program generates or otherwise initiates a security request. During a step 254, the adapter 106 intercepts or otherwise obtains the security request. During a step 256, the adapter 106 parses or otherwise translates the security request to create data indicative of the security request. In some embodiments, such parsing or translation may include extracting data from the security request and/or encoding or encrypting the security request or data extracted from the security request. In some embodiments, the adapter 106 may translate the security request from a format or protocol dependent or specific to the application 110 (or its environment) into another format or protocol (e.g., SAML). During a step 258, the adapter 106 passes or sends some or all of the translated security request (i.e., the data resulting from the step 256) to the manager 102.

During a step 260, the manager 102 determines a security requirement (e.g., authentication of a principal, authorization of a principal to access a resource) associated with the security request identified during the step 252 by examining the data received from the adapter 106. During a step 262, the manager 102 may then identify or otherwise determine a mapper 104 that is associated with a security service that is suitable or able to process the security request or otherwise respond to the security request. In some embodiments, the step 262 may include or encompass the step 260 or the step 260 may form part of the step 262. As different mappers may be associated with different security services, the manager 102 selects the security service during the step 262 by selecting or determining the mapper associated with the security service.

During a step 264, the manager passes or sends some or all of the data received from the adapter 106 to the selected mapper 104. In some embodiments, the mapper 104 may receive data from the manager 102 in the same format or protocol used by the adapter 106 to provide data to the manager 102.

During a step 266, the mapper 104 prepares a security request for the associated security service (e.g., one of the security services 118) based on the data the mapper 104 received from the manager 102. In some embodiments, the mapper 104 may translate or otherwise transform the data received from the manager 102 into a format or protocol understandable or usable by the security service. The format or protocol used by the security service may be different than the format or protocol used by the application 110 (or its associated environment) to initiate the security request that was identified by the adapter during the step 254. In some embodiments, the mapper 104 may access the storage/resource 122 to obtain information needed to create the security request, to conduct attribute mapping, to access attribute mapping algorithms, etc. In some embodiments, the step 266 or the method 250 may include mapping an attribute from one security domain from one security service to an attribute in another security domain.

During a step 268, the mapper 104 may call or invoke the selected security service and pass the security request prepared by the mapper 104 during the step 266 to the security service.

During a step 270, the security service processes the security request received from the mapper 104 and generates or otherwise initiates a response. In some situations or embodiments, the security service may need to access the storage/resource 122 or some other electronic resource to process the security request. For example, the security service may need to access a security policy stored on the storage/resource 122 to determine how to respond to a security request. More specifically, the security policy may govern if the application 110 can be authorized to access a database. The application 110 may request such authorization as part of a security request identified during the step 252.

During a step 272, the security service provides the response to the mapper 104.

During a step 274, the mapper 104 may parse or otherwise transform or translate the response received from the security service into another format or protocol (e.g., SAML) to create data indicative of the response created by the security service. During a step 276, the mapper 104 passes some or all of the data to the manager 102.

During a step 278, the manager 102 passes some or all of the data received from the mapper 104 to the adapter 106. During a step 280, the adapter 106 may translate or transform the data received from the manager 102 into a response having a format or protocol understandable, recognizable or usable by the application 110 or an environment associated with the application 110, or the other device or software program that initiated the security request. During a step 282, the adapter provides the response to the application 110 or the environment or another device or software program that initiated the security request.

Other embodiments of the methods disclosed herein are also possible. For example, in some embodiments, a method for facilitating security in a network from the viewpoint of an adapter may include intercepting or otherwise identifying a security request associated with an application; providing data from the security request to a manager of at least one security service that can process the security request; receiving data from the manager indicative of a response to the security request; and providing a response to the security request based on the data received from the manager to the application and/or an environment associated with the application. In some embodiments, this method may include translating or otherwise parsing the security request to generate or otherwise create the data indicative of the security request.

As another example, in some embodiments, a method for facilitating security in a network may include causing a security request associated with an application to be intercepted or otherwise identified; causing data from the security request to be provided to a manager of at least one security service that can process the security request; causing data to be received from the manager indicative of a response to the security request; and causing a response to be provided regarding the security request based on the data received from the manager. In some embodiments, this method may be implemented by, for, under the control of, or from the viewpoint of the adapter 106. The response to the security request may be provided to the application or to an environment associated with the application. In some embodiments, this method may include causing the translating or other parsing of the security request to generate or otherwise create the data indicative of the security request.

As another example, in some embodiments, a method for facilitating security in a network may include associating an application with a security framework, wherein the security framework includes an adapter associated with the application; causing the adapter to intercept or otherwise identify a security request associated with the application; and causing the adapter to provide data indicative of the security request (which may be provided directly or indirectly to a manager or mapper). In addition, in some embodiments, the method may include causing the adapter to receive data indicative of a response regarding the security request (which may be received directly or indirectly from a manager or mapper) and/or causing the adapter to provide a response regarding the security request to the application, wherein the response may be based on data indicative of the response received from a mapper and/or manager. In some embodiments, the security framework may include a manager capable of selecting a security service to process a security request and/or a mapper associated with one or more security services.

As another example, in some embodiments, a method for facilitating security in a network from the viewpoint of the manager 102 may include receiving data indicative of a security request associated with an application; determining a security requirement associated with the security request; determining a security service that can process the security request in light of the security requirement; invoking the security service; receiving data indicative of a response to the security request; and providing the data indicative of the response to the security request. In some embodiments, the manager 102 may receive the data indicative of a security request from an adapter and/or provide the data indicative of a response to the security request to the adapter. In some embodiments, the manager 102 may invoke or call a security service by calling or invoking a mapper associated with the security service and/or passing some or all of the data indicative of the security request to the mapper. In some embodiments, the manager 102 may receive the data indicative of a response to the security request from the mapper.

As another example, in some embodiments, a method for facilitating security in a network may include associating an application with a security framework, wherein the security framework includes a manager; causing the manager to receive data indicative of a security request associated with the application; and causing the manager to select or otherwise identify a security service capable of processing the security request. In some embodiments, the method also may include causing the security service to be called or invoked, causing the manager to receive data indicative of a response to the security request, and/or causing the manager to provide data indicative of a response to the security request to an adapter associated with the application. In some embodiments, the security framework also may include an adapter associated with the application and that may communicate with the application and/or a mapper associated with the security service and that may communicate with the security service.

As another example, in some embodiments, a method for facilitating security in a network may include causing data to be received that is indicative of a security request associated with an application (e.g., security request data may be received from an adapter); causing a security requirement associated with the security request to be determined; causing a security service that can process the security service to be determined; causing the security service to be invoked (e.g., by calling a mapper associated with the security request that in turn calls the security request and/or passing the security request data to the mapper); causing data indicative of a response created by the security service regarding the security request to be received (e.g., response data may be received from a mapper); and causing data indicative of the response regarding the security request to be provided (e.g., response data may be provided to an adapter). In some embodiments, this method may be implemented by, for, under the control of, or from the viewpoint of the manager 102.

As another example, in some embodiments, a method for facilitating security in a network from the viewpoint of a mapper may include receiving data indicative of a security request associated with an application; creating a version of the data indicative of a security request capable of being processed by a security service to create a response to the security request; calling the security service; receiving a response to the security request from the security service; and providing data indicative of the response. In some embodiments, the mapper may receive the data indicative of a security request from the manager 102 and/or provide the data indicative of the response regarding the security request to the manager 102. In some embodiments, this method may include translating or otherwise parsing the response from the security service to generate or otherwise create the data indicative of the response.

As another example, in some embodiments, a method for facilitating security in a network may include associating a security service with a security framework, wherein the security framework may include a mapper associated with one or more security services; causing the mapper to receive, obtain or otherwise identify data indicative of or associated with a security request associated with an application; and causing the mapper to provide data indicative of the security request to the security service. In addition, in some embodiments, the method may include causing the mapper to receive a response regarding the security request from the security service and/or causing the mapper to provide data indicative of the response (which may be provided directly or indirectly to a manager and/or adapter). In some embodiments, the security framework may include a manager capable of selecting a security service to process a security request and/or an adapter associated with the application.

As another example, in some embodiments, a method for facilitating security in a network may include causing data indicative of a security request associated with an application to be received (e.g., the security request data may be received from a manager); causing a version of the data indicative of a security request to be created that is capable of being processed by a security service to create a response regarding the security request; causing the security service to be called (which may include passing the version of the security request to the security service); causing a response regarding the security request from the security service to be received (e.g., the response may be received directly or indirectly from the security service); and causing data indicative of the response to be provided (e.g., the data indicative of the response may be passed to a manager). In some embodiments, this method may be implemented by, for, under the control of, or from the viewpoint of the mapper 104. In some embodiments, this method may include causing the translating or other parsing of the response from the security service to generate the data indicative of the response.

Figure 6:
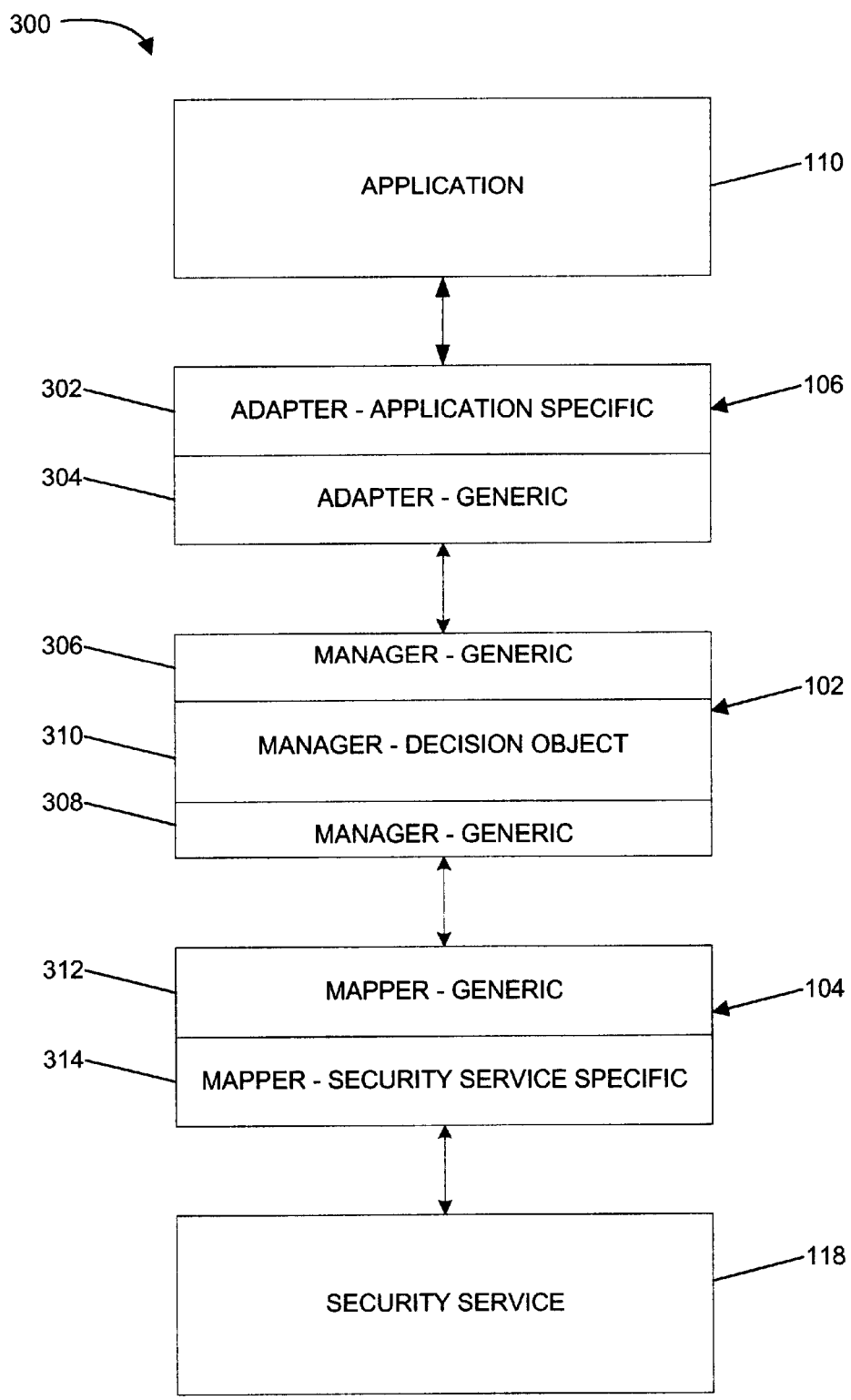
FIG. 6 is a representation of a flow of data between the application, adapter, manager, mapper, and security service of FIG. 1.

Now referring to FIG. 6, a system 300 is provided that illustrates some possible relationships between an adapter or adapter module (here the adapter 106), a manager or manager module (here the manager 102) and a mapper or mapper module (here the mapper 104) and potential subcomponents. The representative system includes the manager 102, mapper(s) 104 and adapter 106 as previously discussed above along with the application 110 and the security service(s) 118.

In some embodiments, the adapter 106 may include an application (or environment) specific portion 302 and a generic portion 304. The specific portion 302 of the adapter 106 may intercept or otherwise identify the security request initiated by the application 110. Thus, in some embodiments, the specific portion 302 may include hardware and/or software hooks, APIs, drivers, interfaces, etc. that allow the adapter 106 to be inserted into the data flow of communications to and from the application 110 (or its environment). The interception point may be application or environment specific so as to allow application or environment specific adapters to be used for the methods and systems disclosed herein. In some embodiments, the application specific portion 302 of the adapter 106 may take the security request received, identified or intercepted by the application specific portion 302 and convert it or otherwise translate it into a different protocol or format. For example, the specific portion 302 of the adapter 106 may take a security request or other communication from the application 110 and convert it or translate it into a SAML format. Different security specific portions of the adapter 106 may be used with different applications and/or environments. Alternatively, in some embodiments, the application specific portion 302 of the adapter 106 may extract data from the security request and pass the data along to the generic portion 304 of the adapter 106 that converts or translates the data into a SAML format.

The generic portion 304 of the adapter 106 allows the adapter 106 to communicate with the manager 102 in a format or protocol that is independent of, and may be different from, the protocols and formats used for communications to and from the application 110 (or its environment) and/or for communications by and between the specific portion 302 of the adapter 106 and the application 110 (or its environment). Thus, the manager 102 does not need to be aware of the protocols or formats used for communications between adapters and applications (or their environments). In addition, neither the mapper 104 nor the security service 118 need to be aware of the protocols or formats used for communications between adapters and applications (or their environments).

In some embodiments, the manager 102 may include generic portions 306 and 308 and one or more decision objects 310. In some embodiments, the generic portions 306 and 308 of the manager 102 may form part or all of the same hardware and/or software component or module. In some embodiments, the manager 102 may include a hierarchy of decision objects to process different types of security requests.

The generic portion 306 of the manager 102 may communicate with the generic portion 304 of the adapter 106. Similarly, the generic portion 308 of the manager 102 may communicate with a generic portion 312 of the mapper 104. Thus, the manager 102 does not need to be aware of use any specific protocol or format associated with, or dependent on, an application, environment, and/or security service. The manager 102 may communicate with the adapter 106 and the mapper 105 using the communication protocol or format established for communication between these three components. Such protocol or format may be content neutral, storage neutral, device neutral, etc. to provided a common but neutral representation of security request data and response data. As a result, a transport mechanism or protocol can be used for communications between the manager 102, adapter 106 and mapper 104 that is independent of the application 110, security service 112, network configuration, etc. In some embodiments, such transport mechanism or protocol may vary depending on the network configuration, the manager and mapper configuration, the desired level of security for the communications, the desired level of encryption for the communications, the desire to use an open standard such as SAML for the communication format, the desire to not use an open standard for the communication format, the desire to use industry standard transport protocols (e.g., HTTP, SMTP, FTP), the desire to use available document exchange frameworks (e.g., SOAP, Biztalk, XML), etc.

In some embodiments, the decision object 310 may act as a router or switch that dynamically routes security request information received from adapters to the appropriate mappers after the decision object 310 has determined which security services should respond to or process the security requests. The decision object 310 may use information in the data received from the adapter 106 and other algorithms, functions, rules, conventions, heuristics, security policies, processes, filters, routing designations, etc. (some or all of which may be stored in the resource 122 or in a security administration dashboard) to decide which security service should be used to respond to a specific security request. As different security requests may require different actions or operations (e.g., authentication, attribute retrieval, authorization, administration, auditing), in some embodiments, different security services may be needed to process or respond to different security requests. The decision object 310 will select the appropriate security service to process a given security request. For example, decisions made by the decision object 310 may be based in whole or in part on what the security request is asking for; what the decision object 310 is allowed or required to provide or select (which may be governed by one or more security or administrative policies; one or more constraints, requirements or limitations established by a system or security administrator; one or more routing rules established when an application or security service is registered with the manager 102 or recognized by the manager 102; etc.); the type of security request (e.g., authorization, authentication or attribute); the identify of the application that the security request came from or is associated with; etc. As a more specific example, a security administrator may establish a policy that an attribute request from an IIS oriented Web server should use the attributes stored in a Microsoft® active directory and associated with users in the active directory security domain, accounting department. In some embodiments, the decision object 310 may need to map or translate an attribute associated with a security request to a different attribute prior or as part to selecting a security service to process the security service. In some embodiments, upon receiving a response to a security request, the decision object 310 may make a determination as to whether an assertion included in the response should be signed.

There are three aspects that may be used to establish a routing algorithm used by the decision object 310; namely, the identification of a specific application to an adapter, the identification of a type of security request being made by the application, and the setting of the security policy to associate a particular mapper with the security request. For example, in an IIS attribute adapter, the adapter may query an IIS Web server for its particular instance name. The Web server name may be established as a standard Microsoft® software input to the IIS and is available on request by the adapter. The particular adapter, in this case the IIS attribute adapter, knows the type of request it is to make, i.e. an attribute request. To complete the routing information the system or security administrator inserts a policy in the system's persistent store (e.g., the storage/resource 122). The policy may be of the form: an attribute request from the IIS Web server uses the IISAttributeMapper5. The specific mapper, in this case IISAttributeMapper5 selects the Microsoft® active directory as its attribute security service store.

In some embodiments, different hardware and/or software configurations for applications, security services, the system 100 or 150, etc. may require that different security services be used to process different security requests.

In some embodiments, the mapper 104 may include the generic portion 312 and a security service specific portion 314. The generic portion 312 of the mapper 104 allows the mapper 104 to communicate with the manager 102 in a format or protocol that is independent of, and may be different from, the protocols and formats used for communications to and from the security service 118 and/or for communications by and between the specific portion 314 of the mapper 104 and the security service 118. Thus, the manager 102 does not need to be aware of the protocols or formats used for communications between mappers and security services. In addition, neither the adapter 106 nor the application 110 need to be aware of the protocols or formats used for communications between mappers and security services. The generic portion 312 of the mapper 104 receives calls from the generic portion 308 of the manager 102 and passes the data to the specific portion 314 of the mapper 104.

The specific portion 314 of the mapper 104 may use the data from the manager 102 received by the generic portion 312 of the mapper 104 to create or generate security requests that are understandable and recognizable to, and usable by, the security service 118 or in calls made to the security service to process a security request. Thus, in some embodiments, the specific portion 314 of the mapper 104 may include hardware and/or software hooks, interfaces, APIs, drivers, etc. that allow the mapper 104 to be inserted into the data flow of communications to and from the security service 118. Different security specific portions of the mapper 104 may be used with different security services.

The application specific portion 314 of the mapper 104 may take the response to a security request received from the security service 118 and convert it or otherwise translate it into a different protocol or format. For example, the specific portion 314 of the mapper 104 may take a security request or other communication from the application 110 and convert it or translate it into or using SAML. In addition, in some embodiments, the specific portion 314 of the mapper 104 may map or translate portions of the response into attributes.

As a more specific example of how SAML may be used to represent a security request by the adapter 106, manager 102 and mapper 104, the application 110 may generate a security request that is intercepted by the generic portion 302 of the adapter 106. The security request may request an answer to an authentication, assertion, or access decision. An authentication type security request may ask for an answer to the question—has this subject (e.g., Jane Smith) been authenticated? An authorization type security request may ask for an answer to the question—can this subject perform this action (e.g., data retrieval) on this resource (e.g., a database)? An attribute type security request may ask for an answer to the question—what are the attributes for this subject? For purposes of communication via the mapper 104, manager 102, and adapter 102, the mapper 104 converts, translates of otherwise maps the response(s) to the security request into a SAML based format. Thus, the response is returned in the form of a SAML assertion, i.e., an assertion by the issuer that the statement (e.g., Jane Smith has been authenticated) is true.

The security request intercepted by the adapter 106 may include one or more of the following: a definition of the type of assertion requested and an identification of the subject of the security request. For an authentication type security request, the request may include or identify a confirmation method used in responding to the request. For an authorization type security request, the request may include or identify a resource, the actions desired to perform on the resource, and optional evidence (e.g., can Jane Smith access the method ViewAccountBalance in Java Bean Account using the authentication assertion for Jane Smith as evidence?). For an attribute type security request, the request may include or identify the type of attributes requested and whether permitted attributes are required.

The security request may be mapped or otherwise translated by the specific portion 302 of the adapter 106 into a SAML request. The SAML request may be passed by the generic portion 304 of the adapter 106 to the manager 102, which in turn selects the security service to process the security request and calls the appropriate mapper (in this example, the mapper 104). The manager then provides the SAML request to the generic portion 312 of the mapper 104. The specific portion 314 of the mapper 104 then maps or transforms the SAML request to the APIs of the selected security service 118. For example, an attribute type security request for an attribute of a given type might require that the security request be transformed or mapped into an LDAP (Lightweight Directory Access Protocol) request to get a specific users group and then that group transformed into a canonical role.

An authorization type security request may require the mapper 104 to make an attribute request on an attribute security service and the use the returned information or response to make an authorization type security request to an authorization security service. Thus, a single authorization type security request from the application 110 may result into two security requests from the mapper 104, one to retrieve attributes and one to conduct an authorization based on the retrieved attributes.

A response to the security request mapped or converted by the mapper 104 to the security service 118 may include one or more assertions and the status of the assertions. The response is received by the specific portion 314 of the mapper 104 and, in some embodiments, is converted by the generic portion 314 of the mapper 104 into SAML assertions. Alternatively, in some embodiments, the specific portion 314 of the mapper 104 may extract data from the response received from the security service and pass the data to the generic portion 312 of the mapper 104 that converts or translates the data into a SAML format before providing it to the manager 102.

A SAML assertion may include one or more of the following: (1) the subject, i.e., who is this assertion about?; (2) the validity time, i.e., how long is this assertion valid for?; (3) the issuer, i.e., the security service 118; and/or (4) an optional digital signature. In addition, the SAML assertion created by the specific portion 314 may include an authentication, attribute, and/or authorization statement types. A SAML authentication statement may include a description of identifier of the authentication method used, a time that the authentication assertion or statement was issued, and/or a description or identifier of where the authentication took place. A SAML attribute statement may include a list of attributes (e.g., roles administrator and manager). A SAML authorization statement may include a description or identifier of the resource involved in the security request (i.e., the thing that the subject wishes to perform some action on), a description of the action, the decision determined by the security service 118 regarding the authorization request, and evidence (e.g., the information and data used by the security service in processing the security request or making the authorization decision.

The generic portion 312 of the mapper 104 may pass the SAML formatted response to the manager 102, which in turn passes it to the generic portion 304 of the adapter 106 that provides it to the specific portion 302 of the adapter 106. The specific portion 302 of the adapter 106 may then map or transform the SAML response request to the APIs of the application 110 and provides the transformed response to the application 110.

For example, in the attribute example discussed above, the IISAttributeMapper may retrieve the attributes for the principal in question, which have been transformed from the specific attributes stored in an active directory sending them as parameters to the API of the generic portion 312 of the mapper 104. The generic part 312 of the mapper 104 creates a SAML attribute assertion and SAML attribute response, and calls the transport that sends the response to the adapter 106 via the manager 102. The generic portion 304 of the IIS adapter 106 receives the response and parses it. The specific portion 302 of the IIS adapter 106 then requests the SAML assertion and puts it in the HTTP request that is sent to the next application in the system.

In some embodiments, the specific portion 302 or the generic portion 304 of the adapter 106 may encode or encrypt data before transmitting the data to the manager 102 and decode or decrypt data received from the manager 102. Similarly, the specific portion 314 or the generic portion 312 of the mapper 104 may encode or encrypt data before transmitting it to the manager 102 and decode or decrypt data received from the manager 102. In such embodiments, the adapter 106 and the mapper 104 provide heightened component to component security, communication security and network security for the system 100.

As an example of data flow through the adapter 106, manager 102 and mapper 104, suppose a user named "Michael Smith" accesses a Microsoft® IIS web server, e.g., the server 112, via a browser enabled user device, e.g., the user device 116. The user device 116 may generate a security request to obtain security attributes for the user. The web server 112, upon not seeing or detecting any authentication evidence may cause the user to login, thereby completing the step 252. Authentication evidence resulting from the login is sent by the user device 116 to the IIS based server 112, which performs a native Microsoft Windows® software authentication.

The adapter 106 may be programmed as a dll. Thus, the adapter dll may use the standard Microsoft® ASAPI protocol to register itself as an extension of the Microsoft® IIS web server 112. The may put the adapter dll in the IIS data flow path just after the IIS web server 112 has authenticated the user and before control is returned to the IIS web server 112. Before control is passed back to the web server 112 from Microsoft Windows® software, data flow is interrupted by an ASAPI filter and extension contained in the adapter dll, thereby completing the step 254. An unsuccessful authentication will not reach the ASAPI dll. The specific portion 302 of the adapter 106 identifies the security request and retrieves the user name (e.g., UserName: msmith) and identification of the particular web server 112 (e.g., "IIS Server 3"), thereby completing the step 256.

The specific portion 302 of the adapter 106 passes the user name and web server identification information to the generic portion 304 of the adapter 106, which may create a portion of a SAML attribute assertion as well as a SAML request document. Such actions may be or form part of the step 256. The SAML attribute assertion and the SAML request document may be translated into an XML (Extensible Markup Language) format which depicts an attribute request to obtain role attributes for the user "msmith". For example, a snippet in the XML language may be or include the following:

```
<Request
    RequestID=002121 MajorVersion=1 MinorVersion=0
        SourceName=IIS
        SourceType=Web Server>
    <AttributeQuery CompletenessSpecifier=Partial>
        <Subject>
            <NameIdentifier
                SecurityDomain=hitachi.com
                Name=msmith/>
        </Subject>
        <AttributeDesignator
            AttributeName=Role
            AttributeNamespace=http://www.hitachi.com/>
    </AttributeQuery>
</Request>
```

The security request is for role attributes defined in a namespace of Hitachi. com for msmith. The generic portion 304 of the adapter 106 sends the security request to the generic portion 306 of the manager 102, thereby completing the step 258. In some embodiments, there may be multiple managers to which the adapter 106 can send the security request. The adapter 106 may find the address of the appropriate manager by accessing or using a database or locator, which may store addresses for one or more running managers.

Once the generic portion 306 of the manager 102 receives the security request from the generic portion 304 of the adapter 106, the generic portion 306 of the manager 102 may parse the security request into a document object model (DOM) tree, which is an in-memory representation of the XML document, and send the request reference to the decision object 310. The decision object 310 then determines which mapper to use or load for the particular security request, thereby completing the steps 260 and 262. In this example, the decision object 310 may use two different types of date to make the determination. First, the identification of the type of security request (e.g., authentication, authorization, attribute) and the identification of the application from where the security request came. Second, an administration policy that designates which mapper to use for which request type, application instance pair. The decision object 310 may extract the needed information from the SAML formatted version of the security request provided by the adapter 106. As a result, the system 100 provides a dynamic policy driven mechanism to mix and match different security services, determined by their particular mapper, to different instances of an application.

Different instances of an application and/or different security request types may result in different mappers being selected by the decision object. As different mappers are associated with different security services, the decision object or the manager 102 selects the security service during the step 262 by selecting the mapper associated with the security service.

Assuming that the mapper 104 is selected by the decision object 310 during the step 262, the generic portion 308 of the manager 102 provides some or all of the SAML formatted security request to the generic portion 312 of the mapper 104 during the step 264. The generic portion 312 of the mapper 104 receives the security request and retrieves the user name from the security request as part of the step 266. In this example, the mapper 104 is using the Microsoft® active directory, as the security service 118.

The generic portion 312 of the mapper 104 provides the user name information to the specific portion 314 of the mapper 104 that knows how to call into an active directory to get the user's groups since the mapper 104 is written (for this example) for active directory group access. The specific portion 314 of the mapper 102 takes the generic request for attributes and translates them into an LDAP call to the Microsoft® active directory to retrieve the original user's attributes, thereby completing the step 266 and the step 268.

The active directory receives the groups for the user during the step 270 and then calls an attribute translator, thereby passing the group information to the mapper 104 during the step 272, which maps or translates the groups that have active directory syntax and semantics to a generic set of attributes as part of the step 274. The generic set of attributes may be defined or scoped to a specific security domain. The specific portion 314 of the mapper 104 may pass the generic roles for the user to the generic portion 312 of the mapper 104 which may complete a SAML assertion and insert the assertion into a SAML response that is provided to the generic portion 308 of the manager 102 during the step 276.

The SAML response may be translated in an XML format. For example, a snippet of the response in the XML language may be or include the following:

```
<Response
    ResponseID=2343233 InResponseTo=002121 MajorVersion=1 MinorVersion=0
    StatusCode=Success/>
    <Assertion
        MajorVersion=1 MinorVersion=0
        AssertionID=Assert:1000
        Issuer=EASI FRAMEWORK
        IssueInstant=2002-05-31T13:20:00.000-05:00>
        <Conditions NotBefore=2002-05-30T13:20:00.0200-05:00
            NotOnOrAfter=2002-06-31T13:20:00.000-05:00>
            <Audience>http://www.hitachi.com/eng</Audience>
        </Conditions>
        <AttributeStatement>
            <Subject>
                <NameIdentifier SecurityDomain=hitachi.com
                Name=msmith/>
            </Subject>
        <Attribute AttributeName=Role
            AttributeNamespace=http://www.hitachi.com/>
            <AttributeValue>
                Manager
            </AttributeValue>
        </Attribute>
        <Signature
            Id="EasiSignature"
            xmlns=http://www.w3.org/2000/09/xmldsig#>
            <SignatureValue>XmlKdXoFgzvA/47gg==</SignatureValue>
        </Signature>
    </Assertion>
</Response>
```

The generic portion 308 of the manager 102 may pass the response to the decision object which may determine if the assertion should be signed. The decision object 308 may need to refer to an administratively determined policy to make such determination. If the response needs to be signed, the decision object 310 may send the response to a signing object (e.g., a public key-based digital signature service) that digitally signs the assertion and returns it to the decision object 310. The decision object 310 and the generic portion 306 of the manager 102 may pass the response to the generic portion 304 of the adapter 106 during the step 278. The generic portion 304 of the adapter 106 extracts the SAML assertion and passes it to the specific portion 302 of the adapter 106. The specific portion 302 of the adapter 106 converts the SAML assertion into string form (e.g., a string representation of XML, as shown in the example above) as part of the step 280, places into a transport mechanism (e.g., HTTP secured by SSL over TCP/IP) for delivery to the next application, and returns the string to the IIS web server 112 during the step 282.

Manager/Mapper Device

Figure 7:
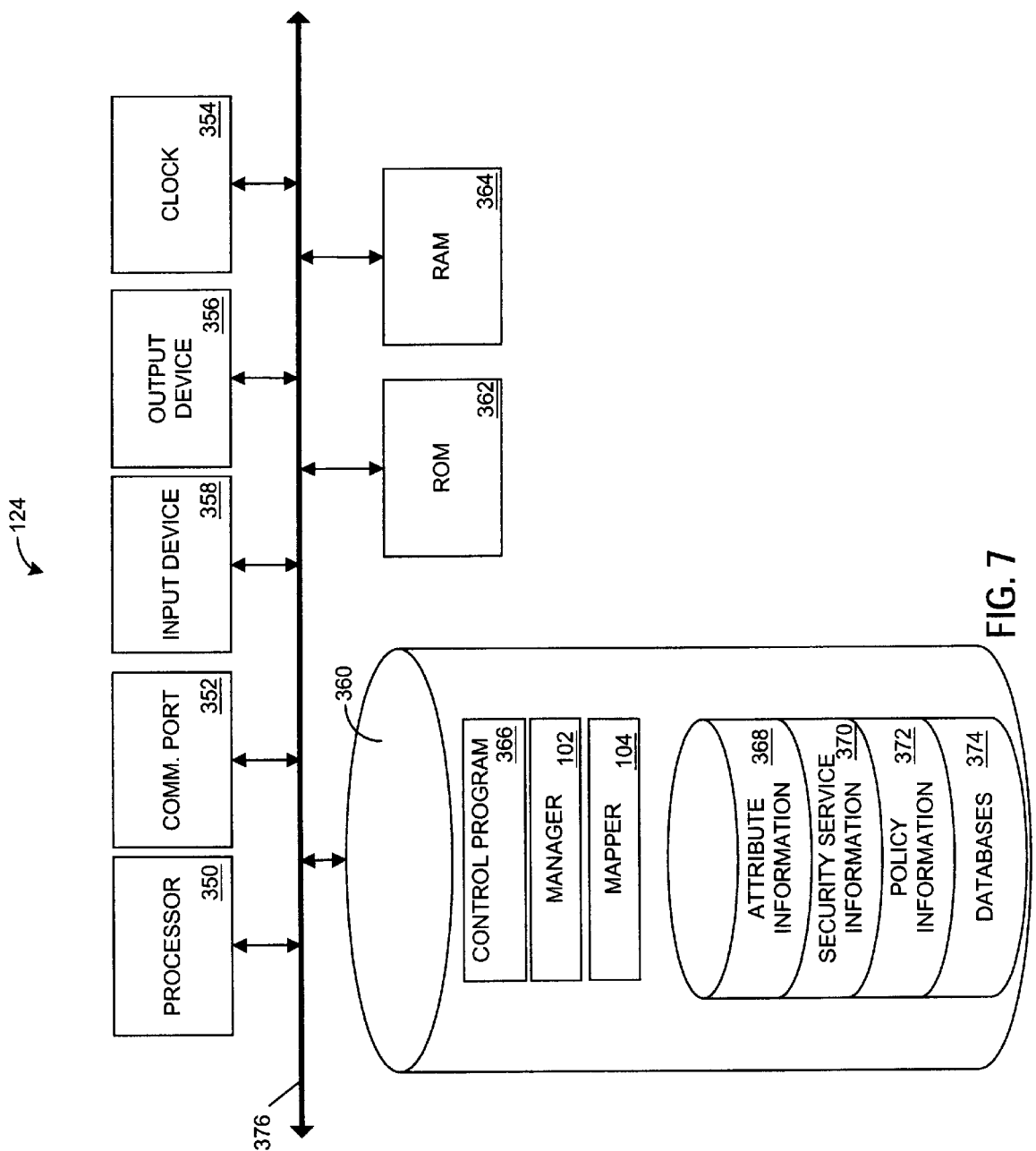
FIG. 7 is a block diagram of components for an embodiment of a manager and mapper system of FIG. 1.

Now referring to FIG. 7, a representative block diagram of a system, device, computer or server 124. As previously discussed above, in some embodiments the device or system 124 may include the manager 102 and/or the mapper 104. In addition, in some embodiments, the device or system 124 may include the attribute mapper 120. In addition, in some embodiments, the device or system 124 may include an application, adapter and/or security service. In some embodiments, the device or system 124 may implement some or all of the steps of some or all of the methods disclosed herein.

The device 124 may include a processor, microchip, central processing unit, or computer 350 that is in communication with or otherwise uses or includes one or more communication ports 352 for communicating with user devices, adapters, security services, electronic resources and/or other devices or software. Communication ports may include such things as local area network adapters, wireless communication devices, Bluetooth technology, etc. The device 124 also may include an internal clock element 354 to maintain an accurate time and date for the device 124, create time stamps for communications received or sent by the device 124, etc.

If desired, the device 124 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the device 124 may include a memory or data storage device 360 to store network information, configuration information, attribute information, credential information, entitlement information, mapping algorithms, security policies, software, information regarding users or principals, security requirements, translation algorithms, communication format and protocol information, databases, communications, device drivers, administrative procedures, mapping pointers, electronic addresses, etc. The memory or data storage device 360 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The device 124 also may include separate ROM 362 and RAM 364.

The processor 350 and the data storage device 360 in the device 124 each may be, for example: (i) located entirely within a single computer or other computing device; or (ii) connected to each other by a remote communication medium, such as a serial port cable, telephone line or radio frequency transceiver. In one embodiment, the device 124 may comprise one or more computers that are connected to a remote server computer for maintaining databases.

In some embodiments, a conventional personal computer, host or mainframe, server or workstation with sufficient memory and processing capability may be used as the device 124. The device 124 preferably may be capable of high volume transaction processing, performing a significant number of mathematical calculations in processing communications and database searches. A Pentium® microprocessor such as the Pentium® III or IV microprocessor, manufactured by Intel Corporation may be used for the processor 350. Equivalent or alternative processors may be available from Motorola, Inc., AMD, Inc., or Sun Microsystems, Inc. The processor 350 also may comprise one or more microprocessors, computers, computer systems, etc.

Software may be resident and operating or operational on the device 124. The software may be stored on the data storage device 360 and may include a control program 366 for operating the server, databases, etc. The control program 366 may control the processor 350. The processor 350 preferably performs instructions of the control program 366, and thereby operates in accordance with the present invention, and particularly in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein. In some embodiments, the manager 102 and/or the mapper 104 may be included as hardware and/or software operating on or as part of the device or system 124. If implemented as software, the manager 102 and/or mapper may be stored on or in the data storage device 360.

The device 124 also may include or store information regarding principals, users, user devices, applications, environments, security protocols, attributes, system configuration, security policies, mapping algorithms, protocol and format translation processes, translation formats and protocols, security services, communications, etc. For example, information regarding one or more attributes may be stored in an attribute information database 368 for use by the device 124 or another device or entity. Information regarding one or more security services may be stored in a security service information database 470 for use by the device 124 or another device or entity and information regarding security policies may be stored in a security policy information database 272 for use by the device 124 or another device or entity. In some embodiments, the device 124 also may include other databases or electronic resources 374. In some embodiments, some or all of one or more of the databases may be stored or mirrored remotely from the device 124.

According to an embodiment of the present invention, the instructions of the control program may be read into a main memory from another computer-readable medium, such as from the ROM 352 to the RAM 354. Execution of sequences of the instructions in the control program causes the processor 350 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 376.

While specific implementations and hardware configurations for the device 124 has been illustrated, it should be noted that other implementations and hardware configurations are possible and that no specific implementation or hardware configuration is needed. Thus, not all of the components illustrated in FIG. 7 may be needed for a server implementing the methods disclosed herein. Therefore, many different types of implementations or hardware configurations can be used in the system or device 124 and the methods disclosed herein are not limited to any specific hardware and/or software configuration.

In some embodiments, the methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, where practible, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for facilitating security in a system, wherein the system includes a manager module used in routing a security request associated with an application to a security service module, comprising:
   receiving data indicative of a security request from a first module associated with an application, wherein said first module identified said security request and said security request is associated with said application;
   selecting a security service module capable of processing said security request after said receiving said data indicative of a security request from said first modules, wherein said selecting a security service module is performed dynamically based at least in part on information associated with at least one of said data indicative of a security request and data indicative of a security policy; and
   providing at least some of said data indicative of said security request to a second module capable of calling said security service module to process said security request, wherein said second module is associated with said security service module.

2. The method of claim 1, further comprising:
   receiving from said second module associated with said security service module data indicative of a response from said security service module regarding said security request, wherein said data indicative of a response is in a format independent of said security service module.

3. The method of claim 2, further comprising:
   providing at least some of said data indicative of said response to said first module associated with said application, wherein said data indicative of said response is in a format independent of said application.

4. The method of claim 1, further comprising:
   initiating a module capable of configuring said manager module.

5. The method of claim 4, wherein said configuring adds said manager module to said system.

6. The method of claim 1, wherein said data indicative of a security request is in a format independent of said application.

7. A computer readable storage media having computer readable code implementing a method for facilitating security in a system, wherein said code includes statements for performing the method of claim 1.

8. A method for facilitating security in a system, wherein the system includes an adapter module associated with an application, comprising:
   identifying a security request associated with said application; and
   providing data indicative of said security request to a module in said system that can dynamically select a security service module to process said security request based at least in part on at least one of said security request and a security policy of said system, wherein said data indicative of said security request is in a format independent of said application.

9. The method of claim 8, further comprising:
   receiving from said module data indicative of a response to said security request, wherein said data indicative of a response is independent of said security service module.

10. The method of claim 9, further comprising:
    providing a response regarding said security request to said application, wherein said response is based on said data indicative of a response.

11. The method of claim 8, further comprising:
initiating a module capable of configuring said adapter module and associating said adapter module with said application.

12. The method of claim 11, wherein said configuring adds said adapter module to said system.

13. A computer readable storage media having computer readable code implementing a method for facilitating security in a system, wherein said code includes statements for performing the method of claim 8.

14. A method for facilitating security in a system, wherein the system includes a mapper module associated with a security service module, comprising:
receiving data indicative of a security request associated with an application from a module capable of dynamically selecting said security service module to process said security request based at least in part on at least one of said security request and a security policy of said system, wherein said data associated with said security request is in a format independent of said application; and
providing data indicative of said security request to said security service module.

15. The method of claim 14, further comprising:
receiving a response regarding said security request from said security service module.

16. The method of claim 15, further comprising:
providing data indicative of said response to said module, wherein said data indicative of said response is in a format independent of said security service module.

17. The method of claim 14, further comprising:
initiating a module capable of configuring said mapper module and associating said mapper module with said security service module.

18. The method of claim 17, wherein said configuring adds said mapper module to said system.

19. A computer readable storage media having computer readable code implementing a method for facilitating security in a system, wherein said code includes statements for performing the method of claim 14.

20. A method for facilitating security in system that includes an adapter module associated with an application, at least one mapper module associated with at least one respective security service module, and a manager module in communication with the adapter module and the at least one mapper module, comprising the steps of:
identifying, by said adapter module, a security request associated with an application;
selecting, by said manager module, a security service module that can process said security request, wherein said selecting is performed dynamically based at least in part on data associated with at least one of said security request and a security policy of said system;
calling, by said mapper module, said security service module;
receiving, by said mapper module, a response to said security request from said security service module; and
providing, by said adapter module, said response to said application.

21. The method of claim 20, further comprising:
extracting data from said security request.

22. The method of claim 21, further comprising:
translating said data using a designated protocol.

23. The method of claim 22, wherein said protocol is independent of said application.

24. The method of claim 22, wherein said protocol is independent of said security service module.

25. The method of claim 20, further comprising:
mapping an attribute of one security domain to an attribute in another security domain.

26. The method of claim 20, further comprising:
determining a security requirement associated with said security request.

27. A computer readable storage media having computer readable code implementing a method for facilitating security in a system, wherein said code includes statements for performing the method of claim 20.

28. A method for facilitating security in a system that includes an adapter module associated with an application, at least one mapper module associated with at least one respective security service module, and a manager module in communication with the adapter module and the at least one mapper module, comprising the steps of:
identifying, by said adapter module, a first security request associated with an application;
translating, by said adapter module, said first security request to create data indicative of said first security request;
selecting, by said manager module, a security service module that can process said first security request, said selecting performed dynamically based at least in part on data associated with at least one of said first security request and a security policy of said system;
creating, by said mapper module, a second security request directed to said security service module and based on said data indicative of said first security request;
calling, by said mapper module, said security service module;
receiving, by said mapper module, a first response from said security service module regarding said second security request;
translating, by said mapper module, said first response to create data indicative of said first response;
creating, by said adapter module, a second response regarding said first security request based on said data indicative of said first response; and
providing, by said adapter module, said second response to said application.

29. A computer readable storage media having computer readable code implementing a method for facilitating security in a system, wherein said code includes statements for performing the method of claim 23.

30. The method of claim 23, further comprising:
determining a security requirement associated with said security request.

31. A system for facilitating security in a system, comprising:
an adapter module associated with an application;
a mapper module associated with a security service module;
a manager module in communication with said adapter module and said mapper module;
wherein said adapter module can identify a security request associated with said application, provide data indicative of said security request to said manager module, and provide a response to said application regarding said security request after receiving data indicative of said response from said manager module;

wherein said manager module can receive said data indicative of said security request from said adapter module, dynamically determine to provide said data indicative of said security request to said mapper module if said security service module associated with said mapper module can process said security request, and provide data indicative of said response to said adapter module after receiving said data indicative of said response from said mapper module; and wherein said mapper module can receive said data indicative of said security request from said manager module, prepare a security service module version of said security request, calls said security service module to process said security service module version of said security request, receives a response to said security service module version of said security request from said security service module, and provide data indicative of said response to said manager module.

32. A module for facilitating security in a network, comprising:

an adapter module, wherein said adapter module is operative to identify a security request associated with an application, provide data indicative of said security request to a manager module capable of dynamically selecting a security service module to process said security request based at least in part on said data indicative of said security request, and provide a response to said application regarding said security request after receiving data indicative of said response from said manager module.

33. The adapter module of claim 31, wherein said adapter module includes an application generic portion and an application specific portion.

34. The adapter module of claim 33, wherein said application specific portion identifies said security request, extracts said data indicative of said security request, and provides said response regarding said security request to said application.

35. The adapter module of claim 34, wherein said application generic portion of said adapter module provides said data indicative of said security request to said manager module and receives said data indicative of said response from said manager module.

36. A module for facilitating security in a system, comprising:

a manager module, wherein said manager module is operative to receive data indicative of a security request associated with an application from an adapter module associated with said application, dynamically determine a security service module to process said security request based at least in part on said data indicative of a security request, provide data indicative of said security request to a mapper module associated with said security service module, and provide data indicative of a response regarding said security request to said adapter module after receiving said data indicative of said response from said mapper module.

37. The manager module of claim 36, wherein said manager module includes an application generic portion.

38. The manager module of claim 37, wherein said application generic portion of said manager is in communication with an application generic portion of said adapter module and a security service generic portion of said mapper module.

39. The manager module of claim 38, wherein said application generic portion of said manager module receives said data indicative of said security request from said application generic portion of said adapter module and provides said data indicative of said response to said application generic portion of said adapter module.

40. The manager module of claim 38, wherein said application generic portion of said manager module provides said data indicative of said security request to said security service module generic portion of said mapper module and receives said data indicative of said response from said security service module generic portion of said mapper module.

41. The manager module of claim 36, wherein said manager module includes a decision object.

42. The manager module of claim 41, wherein said decision object selects said security service module to process said security request.

43. A module for facilitating security in a system, comprising:

a mapper module associated with a security service module, wherein said mapper module is dynamically selected by a manager module to receive from the manager module data indicative of a security request associated with an application, prepare a version of said security request specific to a security service module selected by said manager module, call said security service module to process said security service module specific version of said security request, receive a response to said security service module version of said security request from said security service module, and provide data indicative of said response to said manager module.

44. The mapper module of claim 43, wherein said mapper module includes a security service module generic portion and a security service module specific portion.

45. The mapper module of claim 44, wherein said security service module specific portion of said mapper module prepares said security specific version of said security request and receives said response to said security service module version of said security request from said security service module.

46. The mapper module of claim 44, wherein said security service module generic portion of said mapper module receives said data indicative of said security request from said manager module and provides said data indicative of said response to said manager module.

47. An apparatus for facilitating security in a system, wherein the system includes a manager module used in dynamically routing a security request associated with an application to a security service module, comprising:

means for obtaining data indicative of a security request from a first module associated with an application and that identified said security request;

means for dynamically identifying a security service module capable of processing said security request after said data indicative of a security request is obtained based at least in part on said data indicative of a security request; and means for sending at least some of said data indicative of said security request to a second module capable of calling said security service module to process said security request.

* * * * *